(12) United States Patent
Schueren

(10) Patent No.: US 11,542,722 B2
(45) Date of Patent: Jan. 3, 2023

(54) FENCING SUPPORT SYSTEM

(71) Applicant: Thomas Allen Schueren, Heber Springs, AR (US)

(72) Inventor: Thomas Allen Schueren, Heber Springs, AR (US)

( * ) Notice: Subject to any disclaimer, the term of this patent is extended or adjusted under 35 U.S.C. 154(b) by 286 days.

(21) Appl. No.: 17/072,577

(22) Filed: Oct. 16, 2020

(65) Prior Publication Data
US 2022/0120113 A1 Apr. 21, 2022

(51) Int. Cl.
*E04H 17/26* (2006.01)
*E04H 17/02* (2006.01)

(52) U.S. Cl.
CPC ........... *E04H 17/263* (2013.01); *E04H 17/02* (2013.01)

(58) Field of Classification Search
CPC ..... E04H 17/08; E04H 17/14; E04H 17/1413; E04H 17/1447; E04H 17/1448; E04H 17/1473; E04H 17/1488; E04H 17/17; E04H 17/20; E04H 17/22; E04H 17/23
See application file for complete search history.

(56) References Cited

U.S. PATENT DOCUMENTS

| | | | | |
|---|---|---|---|---|
| 1,915,535 A * | 6/1933 | Johnson | .............. | E04H 12/2215 52/153 |
| 3,297,820 A * | 1/1967 | Kew | .................... | H01B 17/145 174/164 |
| 4,078,754 A * | 3/1978 | Gould | .................... | E04H 17/06 403/313 |
| 4,889,322 A * | 12/1989 | Wagner | .................. | E04H 17/08 52/150 |
| 4,936,550 A * | 6/1990 | Wickham | ............ | E04H 17/1413 403/4 |
| 5,042,780 A * | 8/1991 | Yearwood | ............... | E04H 17/08 52/150 |
| 5,046,705 A * | 9/1991 | Williams | .................. | E01F 7/02 256/70 |
| 5,224,241 A * | 7/1993 | Williams | .................. | E05D 7/04 16/253 |
| 5,593,143 A * | 1/1997 | Ferrarin | ................ | F16B 7/0486 248/74.1 |
| 6,394,228 B1 * | 5/2002 | Stephens | .................... | E06C 9/04 182/189 |
| 6,536,745 B2 * | 3/2003 | Roark | ..................... | E04H 17/08 256/65.01 |
| 6,705,598 B2 * | 3/2004 | Collins | .................. | E04H 17/08 256/65.05 |

(Continued)

*Primary Examiner* — Jonathan P Masinick
(74) *Attorney, Agent, or Firm* — Dale J. Ream

(57) ABSTRACT

A fence support system includes brackets that may be attached to t-posts. The system includes modular brackets that may be configured in either a single or dual embodiment for attachment to components on multiple sides of the brackets. The bracket may also be configured with a round plate situated atop the body portion, such that the top of the bracket may be attached to components at a variety of angles. The bracket may be configured in large and small embodiments. The system includes an adjustable brace assembly configured to extend between brackets so as to support respective posts. The bracketry provides a means to hang gates from t-posts, create and support field fence corners and mid fence span supports using common t-posts, including fence intersections that are at non-90-degree angles, and other applications.

20 Claims, 38 Drawing Sheets

(56) References Cited

U.S. PATENT DOCUMENTS

| | | | | |
|---|---|---|---|---|
| 6,883,785 B1* | 4/2005 | Knapp | ................ | E04H 17/1413 |
| | | | | 256/10 |
| 7,883,296 B2* | 2/2011 | Meyer | ..................... | E02D 17/04 |
| | | | | 405/283 |
| 8,272,605 B2* | 9/2012 | Fuchs | ................... | F16B 7/1454 |
| | | | | 248/156 |
| 8,480,061 B2* | 7/2013 | Graves | .................... | E04H 17/20 |
| | | | | 248/220.21 |
| 8,991,777 B2* | 3/2015 | Madril | .................. | E04H 17/263 |
| | | | | 52/127.2 |
| 9,631,770 B2* | 4/2017 | Holestine | ................ | F16M 13/02 |
| 10,287,797 B2* | 5/2019 | Garcia | ................... | E04H 17/08 |
| 10,619,377 B2* | 4/2020 | Beisser, III | ........... | E04H 17/266 |
| 2003/0042475 A1* | 3/2003 | Passafuma | ............. | E04H 17/08 |
| | | | | 248/156 |
| 2005/0050831 A1* | 3/2005 | Lyon | ....................... | E04H 12/10 |
| | | | | 52/653.1 |
| 2006/0284033 A1* | 12/2006 | Wallis | ..................... | A01K 3/00 |
| | | | | 248/127 |
| 2020/0270895 A1* | 8/2020 | Stinson | .................. | E04H 17/14 |

\* cited by examiner

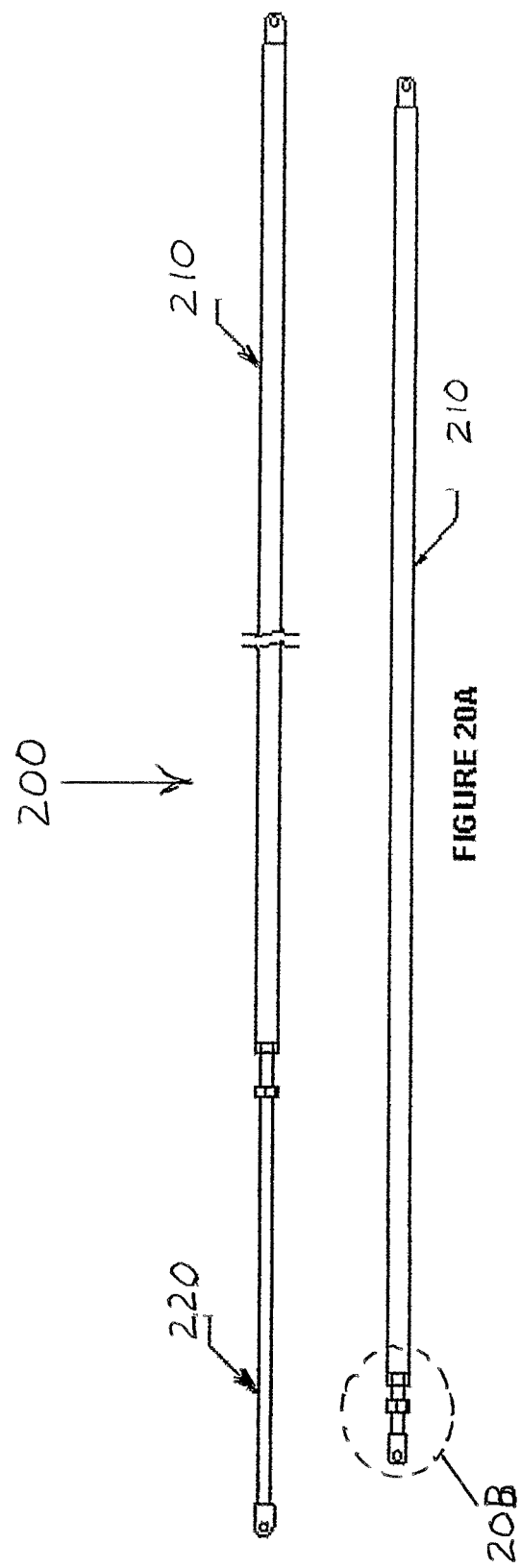

FENCING SUPPORT SYSTEM

REFERENCE TO RELATED APPLICATIONS

This application is related to non-provisional patent application Ser. No. 15/775,023 filed Sep. 5, 2017, titled T-Post Bracketry, T-Post to T-Post Support & T-Post Hinge Componentry.

FIELD OF THE INVENTION

The present invention relates to the brackets and bracketry and, in particular, brackets that may be used in connection with t-posts. More particularly, the present invention discloses brackets that provide a means to create field fence corners, mid span supports, and hanging of gates easily using common t-posts without the need for a wooden post. The present invention also provides a means to affix multiple components to a t-post, and to affix those components at a variety of angles. The present invention may be used for additional applications as well, as described herein. It will be understood that many of the specific brackets and support fixtures may be described individually; however, many of the fencing support systems variations will be shown and described later in the present application and figures. It will also be understood that the particular type of post for use with the present invention may be referred to by the common spellings of a "t-post" or "tee post".

BACKGROUND OF THE INVENTION

T-posts are a type of post commonly used in fencing. Such posts are typically fabricated out of steel. The bottom end of the post typically has a t-shape, or sometimes a y-shape, that allows it to be easily driven into the ground and to maintain stability once in the ground. The spine of the posts is typically lined with cleats, studs, or nubs, sometimes referred to as "teeth". Those teeth or cleats may typically secure the fencing wire, such that it will not slide in a vertical direction.

Brackets exist in the marketplace that may be used in connection with a t-post fencing system. However, those brackets have a number of drawbacks, as described herein. For example, most known bracketry that can be used in connection with t-post fencing systems are limited to use in post-to-post bracing applications. Typically, such brackets are used to connect a t-post that is being used as a fence post, to a second t-post. The second t-post will be placed at an angle to the first, and will serve as a brace for the fencing structure. The bottom end of second t-post has to be connected to an adjacent third t-post by some means.

Because such brackets are designed to connect one or more t-posts, they have the drawback that they are not capable of connecting a t-post to another structure, such as a gate or other component of a fencing system.

In addition, such brackets have fixed components, with the result that they can only connect one post to another at a fixed angle. As a result, the applications for which they can be easily be used is limited.

Known brackets that are used for bracing applications also have the drawback of being labor intensive. Generally, the fence post interval will need to be precisely measured, such that the bracing post fits neatly between fence posts. Alternatively, the bracing posts will need to be cut to fit. Given that the posts are comprised of steel, the cutting process would require specialized equipment not traditionally used in field fence building.

As a result of these drawbacks, it is often necessary to incorporate wood into a t-post fencing structure. For example, because known t-post compatible bracketry is not compatible with gate structures, it is generally necessary to include a wood fence post to anchor the gate. However, wood posts have the disadvantage of being subject to decay and needing replacement. Wood Posts are generally large and require large deep holes that have to be dug by hand or with specialized equipment. Quite often the process of digging holes for wooden post in tales the removal or breaking of rocks or the cutting of tree roots. All of which are negated by the invention and its components.

Therefore, it would be desirable to have a fencing system that overcomes the disadvantages of the prior art and existing bracing systems.

SUMMARY OF THE INVENTION

The current invention addresses the foregoing issues and drawbacks.

The current invention design modularly provides a means to:
Create field fence corners easily using common t-post
Create field fence cross fence corners easily using common t-posts
Create field fence cross fence corners easily using common t-post that are at non 90° angles or intersect with more than two cross fences.
Brace t-post corner posts easily with modular bracketry and the use of standard lumber materials as braces.
Brace t-post corner posts easily with modular bracketry and designed adjustable brace that does not require an exact spacing between adjacent posts.
Brace t-post corners and mid fence spans easily with modular bracketry
Make use of the benefits and attributes of the standard Tee Post by providing sturdy rigid brackets with various adapting options for non-fence related applications such as the display of signs, support of mail boxes, support of bird houses, support of sprinkler heads, support for garden applications, limited only by application and imagination.

In one embodiment, the present invention improves on existing t-post bracing technology by allowing for flexible adjustments. When used in connection with the adjustable post-to-post brace, the present invention can be adjusted such that exact spacing between posts or steel cutting is not required.

In other embodiments, the device of the present invention can be used for applications other than bracing. In particular, it can be used to attach a fence to a t-post, without need for the addition of a wooden post. The device of the present invention is modular, and is easily and intuitively installed. These and other benefits of the present invention are described more fully herein.

The present invention includes components that make use of the t-post teeth in order to keep the device stable and centered. The present invention further includes set screws that secure the bracket by compressing against the flat segments of the t-post spine. In other embodiments, the bracket may be wedged against the flat segment of the t-post spine using the wedge assemblies disclosed herein.

The brackets and other components of the present invention provide post to post support that can be cut to length and bolted or supported with modular tubular supports. The bracketry is further capable of being adjusted for greater ease of installation and versatility.

In one embodiment, the brackets of the present invention can be a stand-alone bracket, which may be used by bolting to the flange patterns and used to fasten any number of components to the tee post. In different embodiments, the device of the present invention may be configured for multiple fence intersections.

The device of the present invention has the benefit of allowing for use in multiple situations, with a minimum of cost and labor involved. For example, the device of the present invention may be used to hang objects such as a mailbox or bird feeder, or may be used for applications such as a sprinkler system. T-posts have the benefit of a small footprint. This is of benefit multiple situations, such as when installing a fence in rocky terrain. In that case, making use of wooden posts entails difficult digging in a wider area. When the entire fence is formed from t-posts and the need for wooden fencing is eliminated, much of the labor and equipment needed is reduced.

BRIEF DESCRIPTION OF THE DRAWINGS

FIG. 10b is a perspective side view of the Dual Flange Large Series Tee Post Bracket as in FIG. 1, illustrated with accessory brace bracket 24 with fasteners.

FIG. 20A is a perspective view of two Adjustable Brace Assemblies according to the present invention.

DESCRIPTION OF THE PREFERRED EMBODIMENTS

Figure 1:
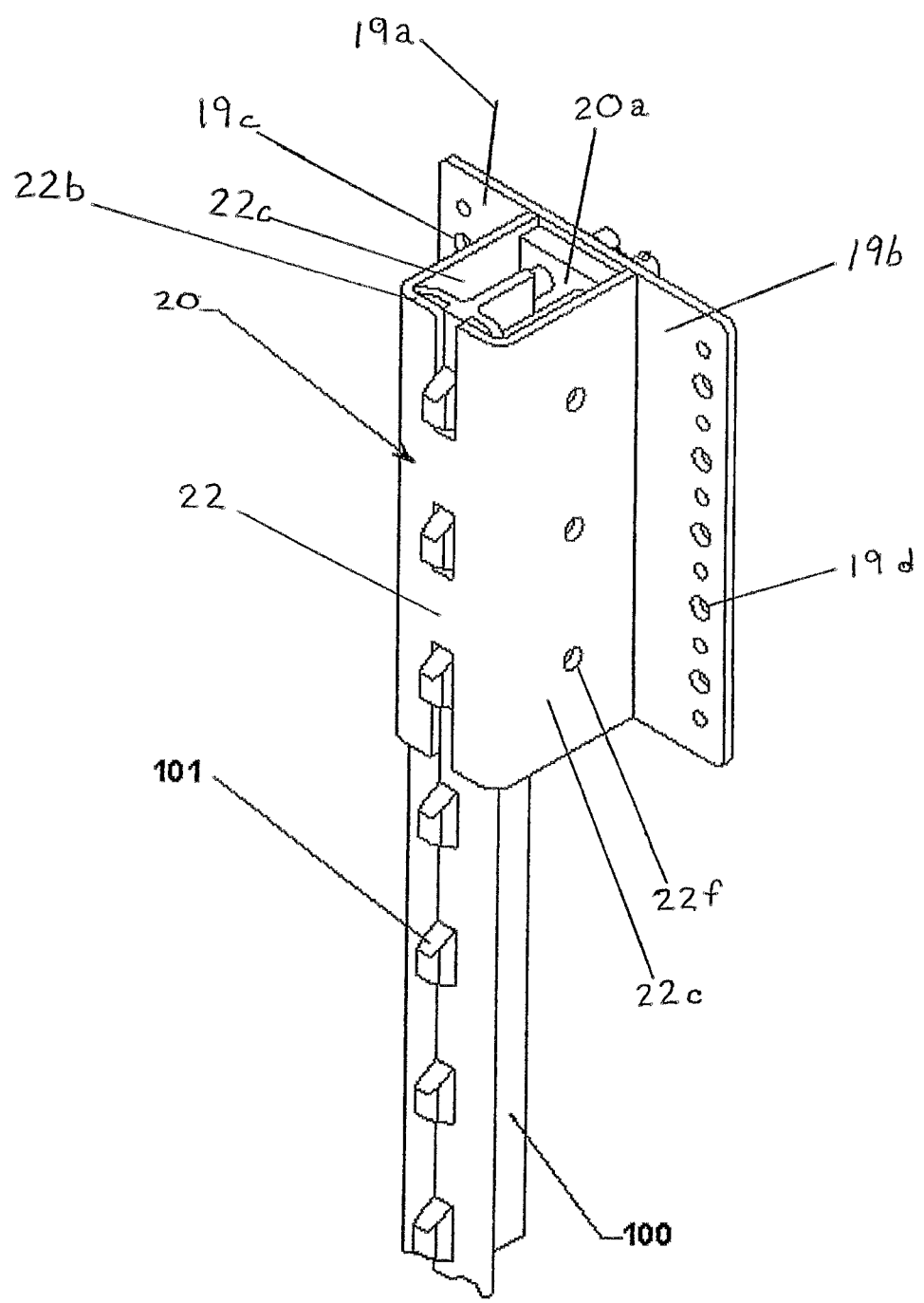
FIG. 1 is a perspective view of a Large Series Tee Post Bracket that has dual flanges as a component of the fencing system according to a preferred embodiment of the present invention, illustrated secured to a Tee Post.

A fencing support system according to a preferred embodiment of the present invention will now be described with reference to FIGS. 1 to 29A of the accompanying drawings. The fencing support system 10 may include a large bracket 20, a small bracket, a bracket and plate combination 30, an adjustable brace assembly 200, and additional accessory bracketry. It is understood that the fencing fixtures described herein have configurations operable for installation on a t-post 100, the t-post having a plurality of cleats 101 spaced apart along an otherwise longitudinal shaft (FIG. 1). Components appearing in more than one figure bear the same reference numerals.

The fencing support system 10 includes a fixture that will be referred simply as a "large bracket" and referred to with reference numeral 20. The large bracket 20 may include dual flanges and be referred more accurately as a Dual Flange Large Series Tee Post Bracket and still referenced with reference numeral 20. FIG. 1 depicts the large bracket 20 of the present invention in the dual sided flange embodiment in which the large bracket 20 may be affixed to components on either side of the tube section of the large bracket 20 via the provided holes. More particularly, the large bracket 20 may include a body portion 22 also referred to as a tube section and a flange 19—essentially a plate having a planar configuration. The body member 22 include an inner face 22a, an outer face 22b opposite the inner face 22a, and a pair of side faces 22c extending between the inner and outer faces. In an embodiment, a flange first section 19a extends in a first direction away from an inner face 20a of the body portion 22 and also in a flange second section 19b extends in a second direction opposite the first direction. Preferably, the flange first section 19a and flange second section 19b are thin plates and are coplanar. In fact, the flange first section 19a and flange second section 19b may have a unitary construction—essentially a single plate having a width that extends in opposing directions perpendicular to the body portion 22. As referenced above, each flange section 19a, 19b may define a plurality of holes 19c, 19d for attachment to other components of the fencing support system 10 and other fencing components. In an embodiment, the flange width of bracket 20 may preferably be sized between 1.5 to 8 inches. The combined flange and body portion 22 of the bracket 20 may preferably be sized between 3.5 to 10 inches.

Figure 7:
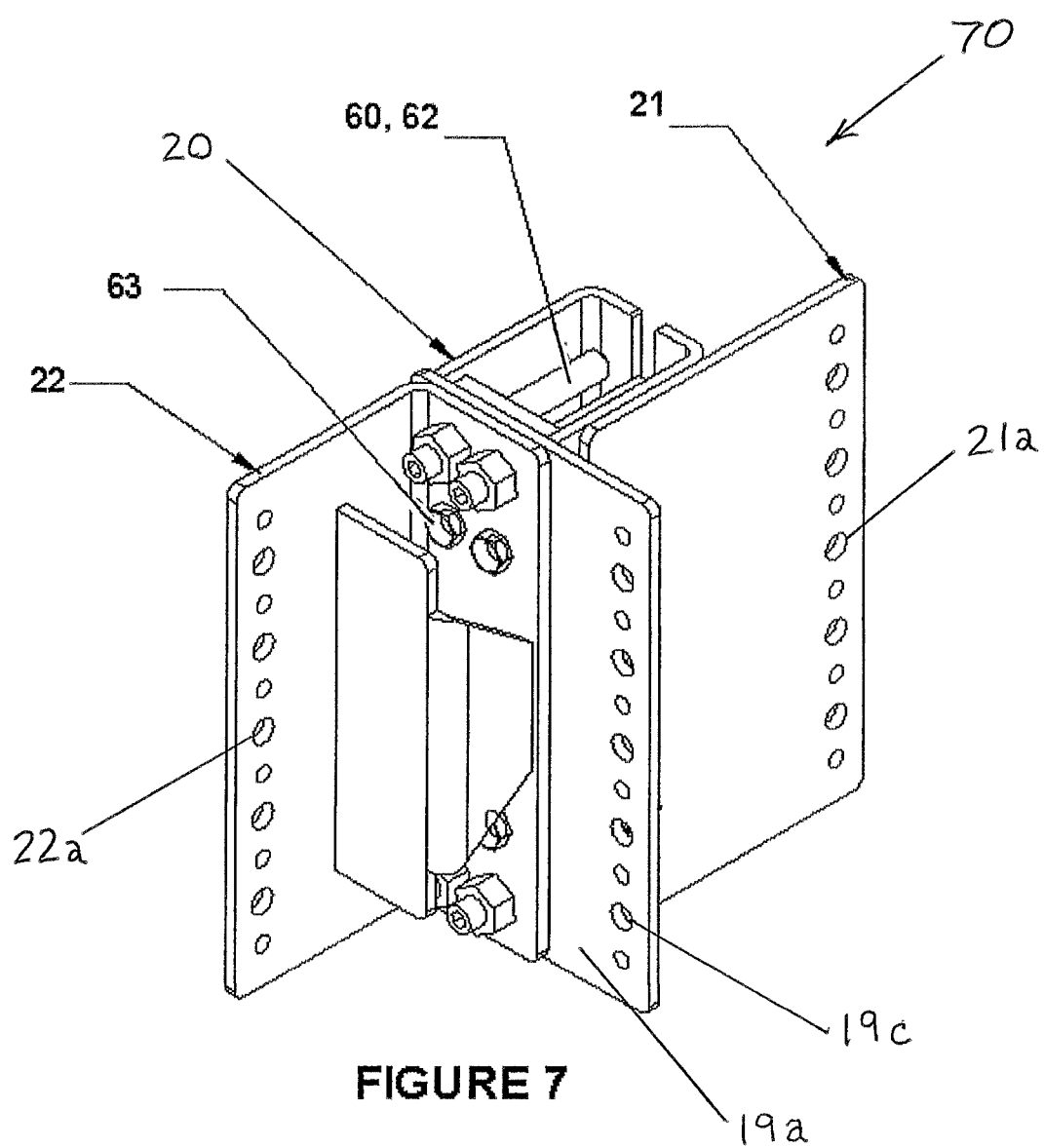
FIG. 7 is a perspective view of the Single Flange Large Series Tee Post Bracket as in FIG. 2, illustrated with accessory brace plate and accessory brace bracket.

The large bracket 20 is locked onto a t-post 100 via the designs set screws not easily seen in FIG. 1 due to the orientation of the view. The set screws 60, 62 are shown in FIG. 7. As shown in FIG. 1, the body portion 22 of the large bracket 20 has an outer face 22b that defines slots 22e each being configured so that, when positioned over the t-post cleats 101, the large bracket 20 is secured onto the t-post 100 and prevented from sliding in either a horizontal or vertical direction. The body portion 22 includes opposed side faces extending between inner and outer faces, respectively, and may each define additional mounting apertures 22f (FIG. 1).

Figure 2:
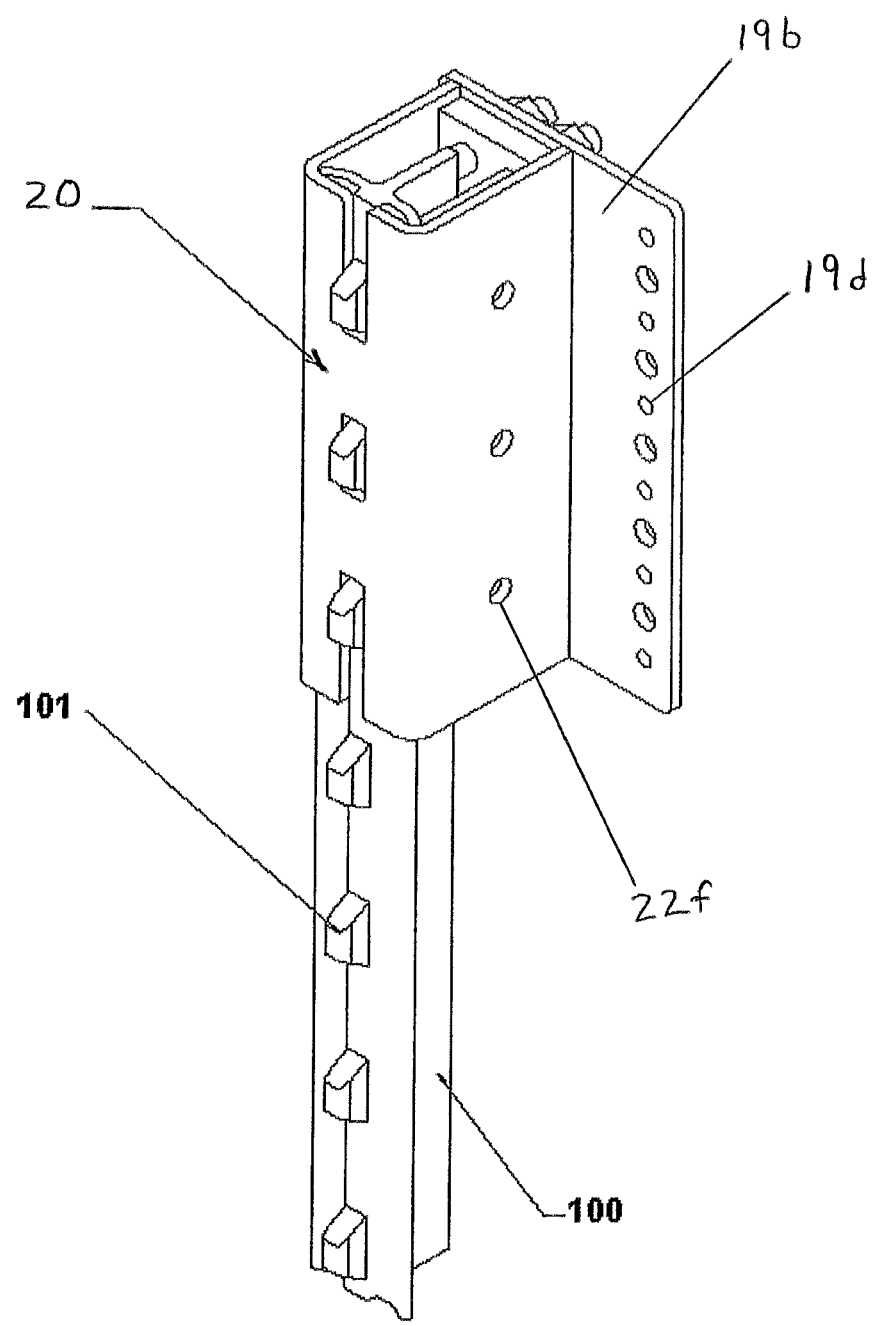
FIG. 2 is a perspective view of a Large Series Tee Post Bracket that has a single flange, according to a preferred embodiment of the present invention.

FIG. 2 depicts a variation of the large bracket 20 of the present invention in a single sided flange bracket embodiment, i.e. includes only a singular first flange section 19a so that the bracket 20 may be affixed to components on only one side by the hole pattern in the flange. The bracket can be affixed to components on both sides of the tubular section by the provided hole patterns in the tubular section. The remainder of the single sided flange bracket of FIG. 2 is substantially similar to that described above and relative to FIG. 1.

Figure 3:
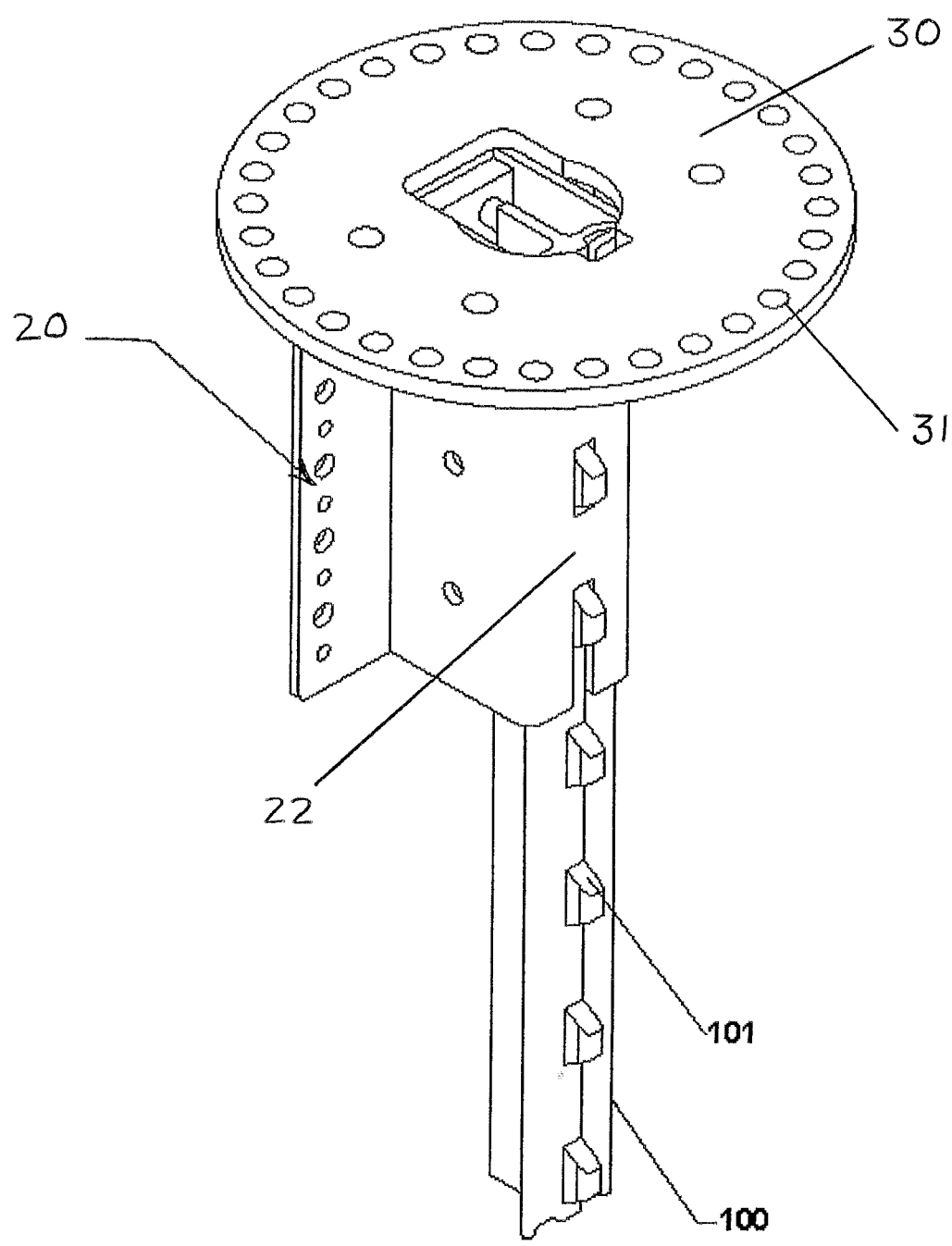
FIG. 3 is a perspective view of a Large Series Tee Post Bracket that has both dual flanges and a top flange.

FIG. 3 depicts the large bracket 20 of the present invention in the dual sided flange embodiment (FIG. 1) coupled to a circular plate 25. Together, this fixture is referred to as a large circular bracket 30. Components may be affixed to both sides of the bracket or on either side of the body portion 22 via the holes described above. In addition, the circular plate 30 defines a plurality of apertures 31, each being spaced apart and positioned adjacent an outer peripheral edge of the circular plate 30. The circular bracket 30 may be locked onto a t-post 100 via the design's set screws and in a manner substantially the same as described previously regarding the large bracket 20. Preferably, the circular plate 30 has a diameter of between 2.5 and 12 inches.

Figure 4:
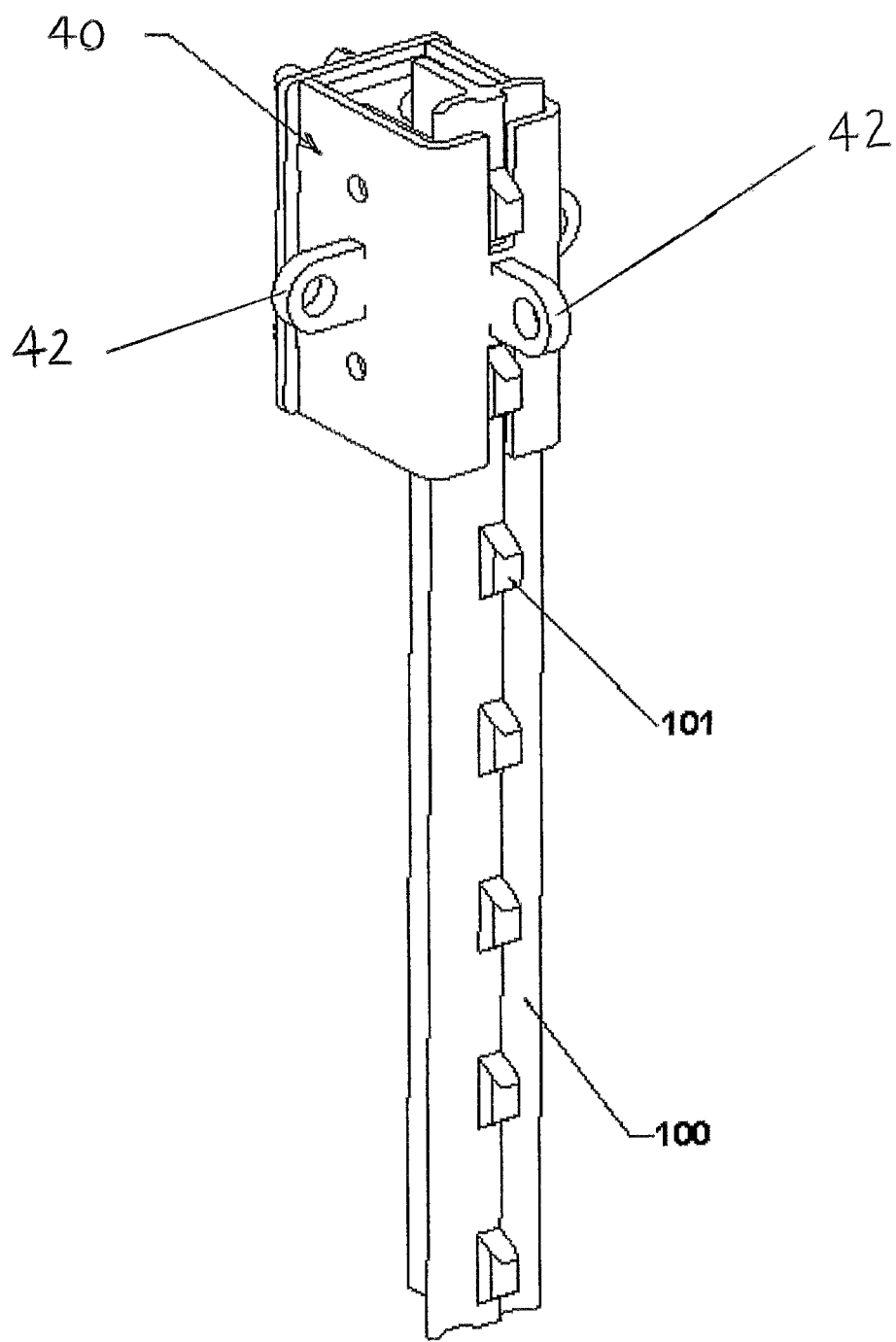
FIG. 4 is a perspective view of a Small Series Tee Post Bracket according to the present invention and that has 4 clevis lugs.

The fencing support system 10 includes a fixture that will be referred simply as a "small bracket" and referred to with reference numeral 40 although the complete name may be referred to as Small Series Tee Post Bracket. It is understood that the small bracket 40 has dimensions smaller than similar structures of the large bracket 20. FIG. 4 depicts the small bracket 40 of the present invention in an embodiment in which a plurality of clevises 42 are positioned all four sides of the small bracket 40. The flange width of the small bracket 40 may preferably be sized between 1.5 to 8 inches. The flange and tubular length of the small bracket 40 may preferably be sized between 1.5 to 3.5 inches. Components may be affixed to the holes in the provided clevises 42. The small bracket 40 includes a body portion (unnumbered) having faces and defining slots in a manner substantially similar to that of the large bracket 20. The small bracket 40 may be locked onto a t-post 100 using structures and a method that is substantially similar to the method discussed above.

Figure 5:
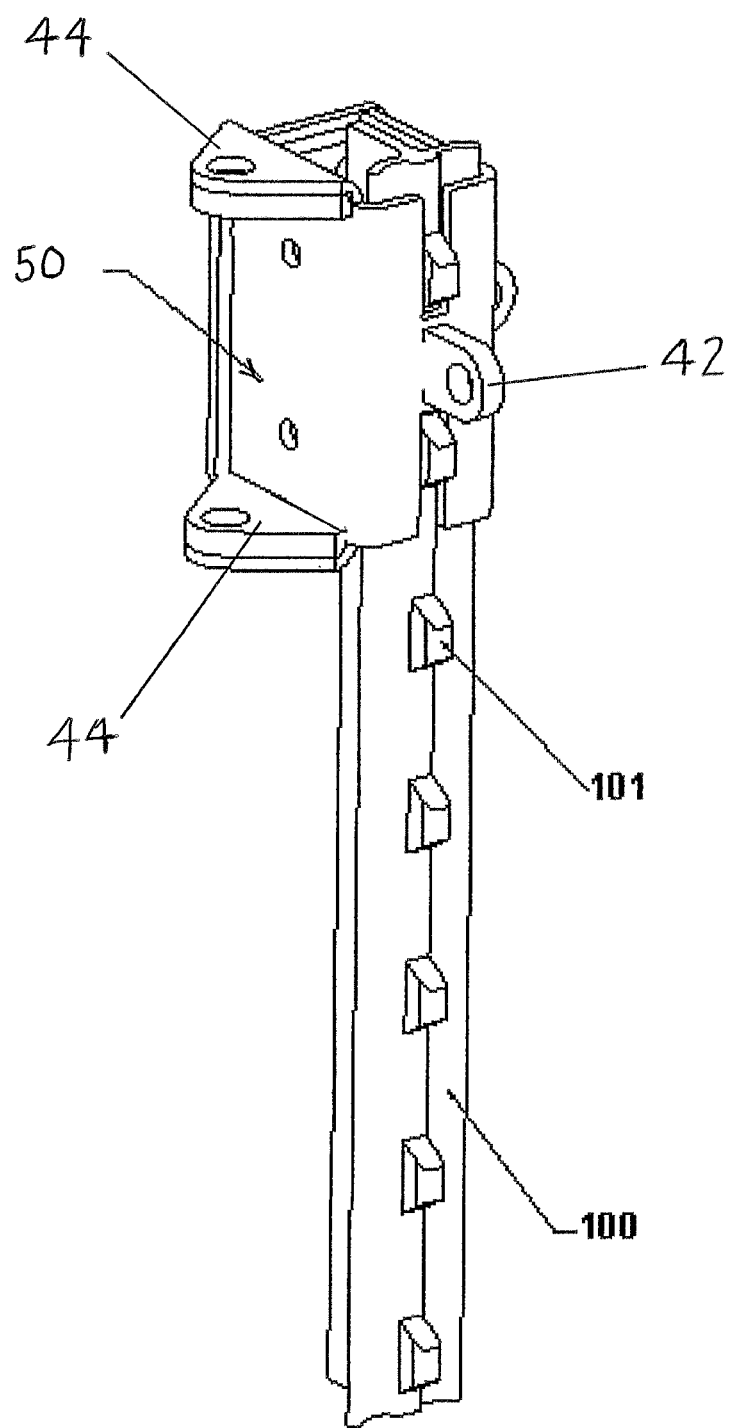
FIG. 5 is a perspective view of a Small Series Tee Post Bracket that has 3 clevis lugs and one side having dual horizontal flanges.

In another aspect, the fencing support system 10 includes a modified small bracket denoted by reference numeral 50. Specifically, FIG. 5 depicts the modified small bracket 50 of the present invention in an embodiment in which mounting fasteners 44 are provided on one side face at the top and bottom of the small bracket 50, such as adjacent the modified outer face thereof. The mounting fasteners 44 each define a hole operable as a hinge for connecting the bracket to a gate. In addition, a clevis 42 is coupled to and extends outwardly from the other three side faces of the body portion (FIG. 5). The modified small bracket 50 has mounting structures that can be mounted to a t-post 100 in a manner substantially the same as described previously.

Figure 6:
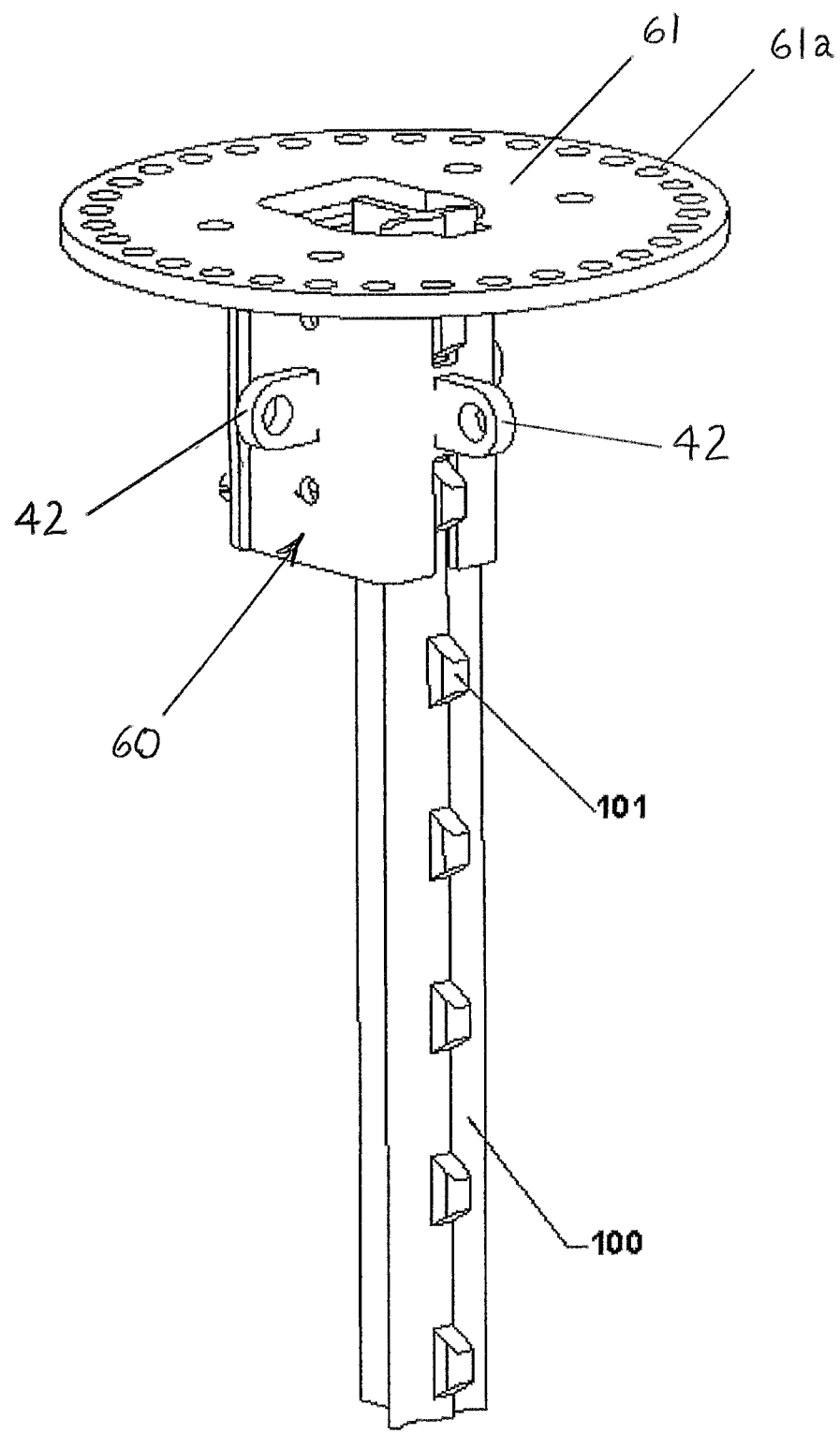
FIG. 6 is a perspective view of a Small Series Tee Post Bracket that has 4 clevis lugs and a top flange.

The fencing support system 10 includes a fixture referred to as small circular bracket 60. FIG. 6 depicts the small bracket of the present invention in an embodiment in which devises 42 are positioned all four sides of bracket and a small circular plate 64 is mounted atop the small bracket 40. Together, this fixture is referred to as a small circular bracket 60 Components may be affixed to both sides of the bracket or on either side of the body portion 22 via the holes 22f described above. In addition, the small circular plate 61 defines a plurality of apertures 61a, each being spaced apart and positioned adjacent an outer peripheral edge of the small circular plate 61. The small circular bracket 60 is locked onto a t-post 100 via the set screws and in a manner substantially the same as described previously regarding the large bracket 20.

FIG. 7 depicts the large bracket 20 having only the first flange section 19a (FIG. 2) having additional structures that provide more functionality for attaching additional brackets and other structures associated with fencing or gates. More particularly, the modified bracket will be referred to as a first auxiliary bracket 70 and includes a first accessory plate 21 and a first accessory bracket 22 attached. First accessory plate 21 is attached to the large bracket 20 with fastener 63 and nut 64 not shown in this Figure. The first accessory bracket 22 may have an L-shaped configuration having a mounting portion attached to large bracket 20, such as with the mounting fastener(s) when engaged and extending through the inner face 20a and flange 19. Also shown in FIG. 7 are the set screws 60 and locking nuts 62 used to secure first auxiliary bracket 70 onto the t-post 100 as shown in FIG. 2. The first accessory plate 21 and first accessory bracket 22 define a plurality of attachment holes 21a, 22a, respectively, for the potential coupling of additional components. The configuration shown in FIG. 7, with its many hole patterns, provides a means by which materials can be attached to the first auxiliary bracket 70 with bolts or screws.

Figure 8:
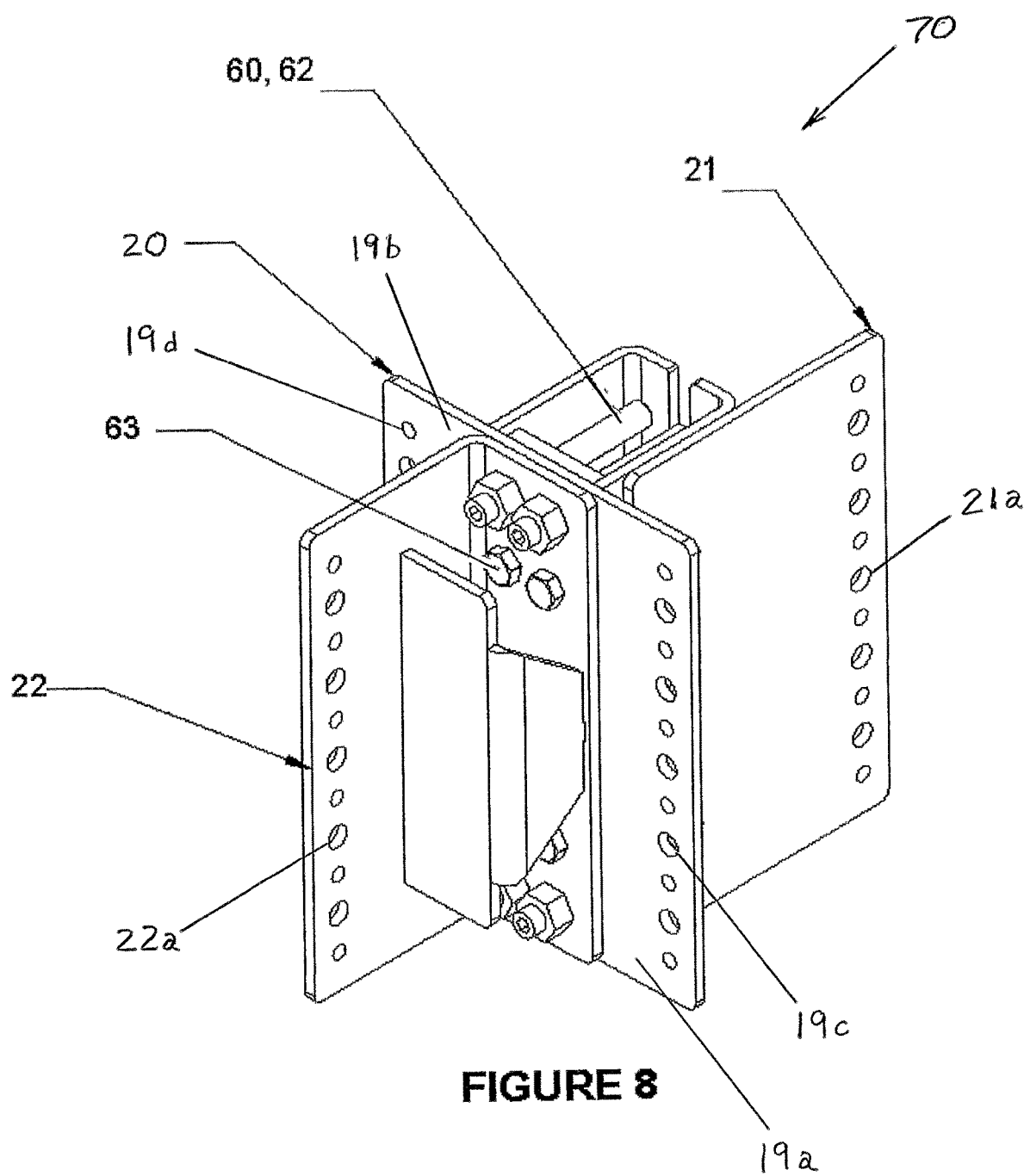
FIG. 8 is a perspective view of the Dual Flange Large Series Tee Post Bracket as in FIG. 1, illustrated with accessory brace plate and accessory brace bracket.

FIG. 8 depicts the large bracket 20 shown in FIG. 1 configured with the first accessory plate 21 and first accessory bracket 22 attached with regard to the first auxiliary bracket 70 described above with reference to FIG. 7. The only difference is that the large bracket 20 pictured in FIG. 8 includes both first flange section 19a and second flange section 19b (i.e. is the double flange embodiment).

Figure 9:
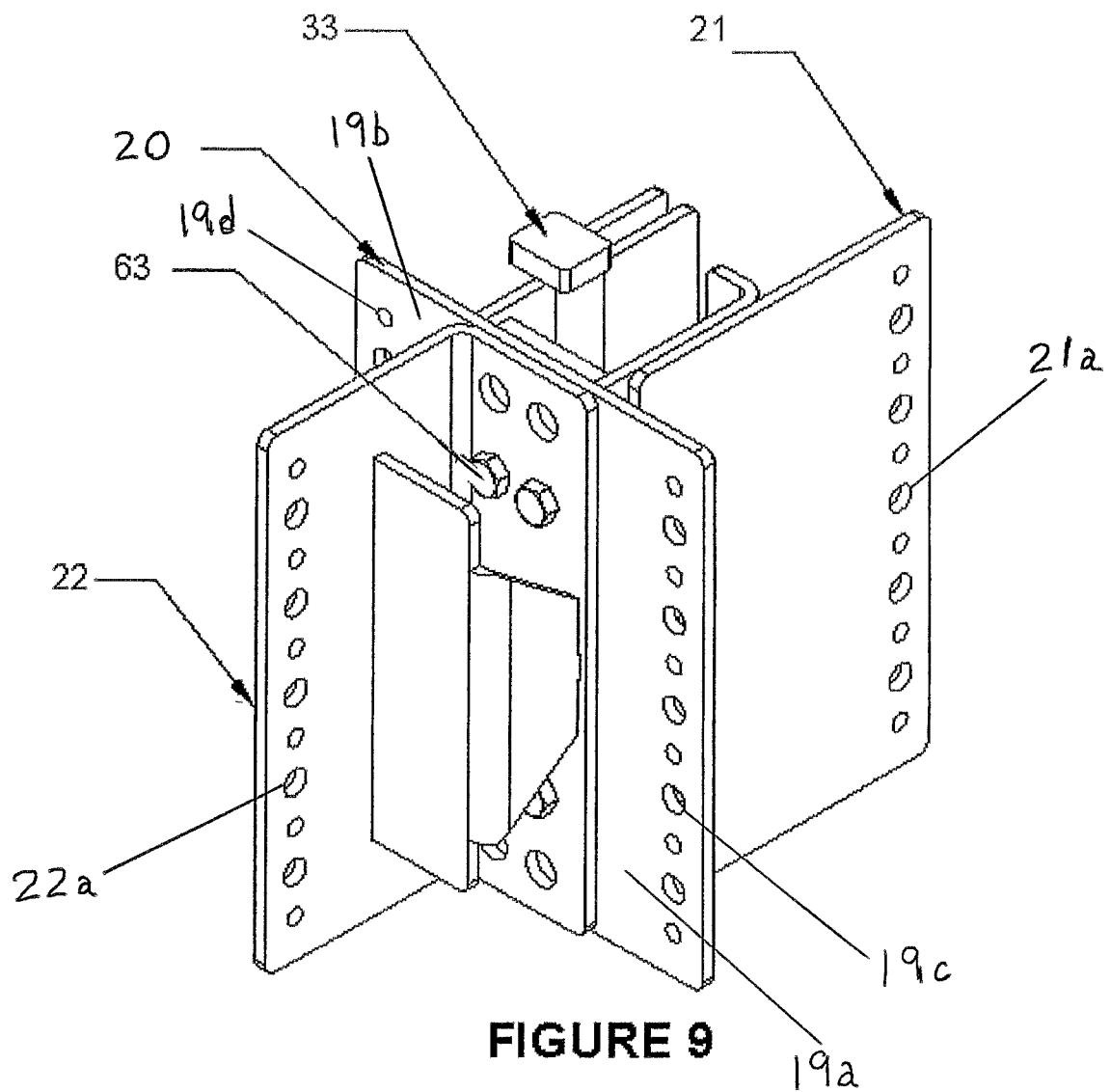
FIG. 9 is a perspective view of the Dual Flange Large Series Tee Post Bracket as in FIG. 1 illustrated with accessory brace plate, accessory brace bracket, and accessory Large Series Bracket Wedge.

FIG. 9 also depicts the double flange section embodiment of the large bracket 20 shown in FIG. 1 and that includes first accessory plate 21 and first accessory bracket 22 described above with reference to FIG. 8. Also shown in FIG. 9 is a locking wedge 33 used to secure the bracket 20 onto the t-post 100 as in FIG. 1. The present invention provides for brackets to be secured to t-posts by either set screws 60 or locking wedges 33.

It will be understood by FIGS. 7 and 8 that the first accessory plate 21 and first accessory bracket 22 are modular and can be attached to large series brackets like those illustrated in FIG. 1, FIG. 2, and FIG. 3. The modularity of these brackets provides the large series brackets 20, 30, 40 with the means by which materials can be attached to a respective bracket with bolts or screws from all four sides of the t-post if necessary.

Figure 10:
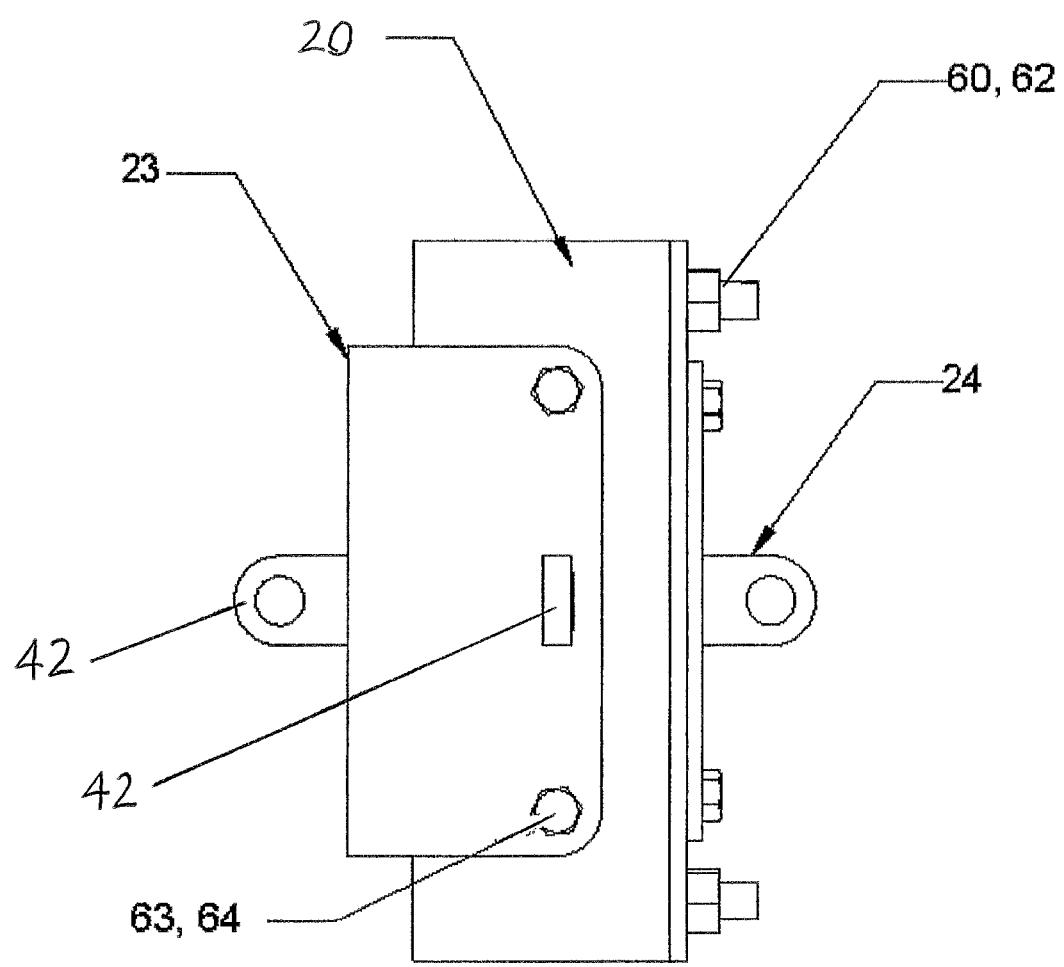
FIG. 10 is a perspective view of the Dual Flange Large Series Tee Post Bracket as in FIG. 1, illustrated with accessory brace bracket and accessory brace bracket.
Figure 14:
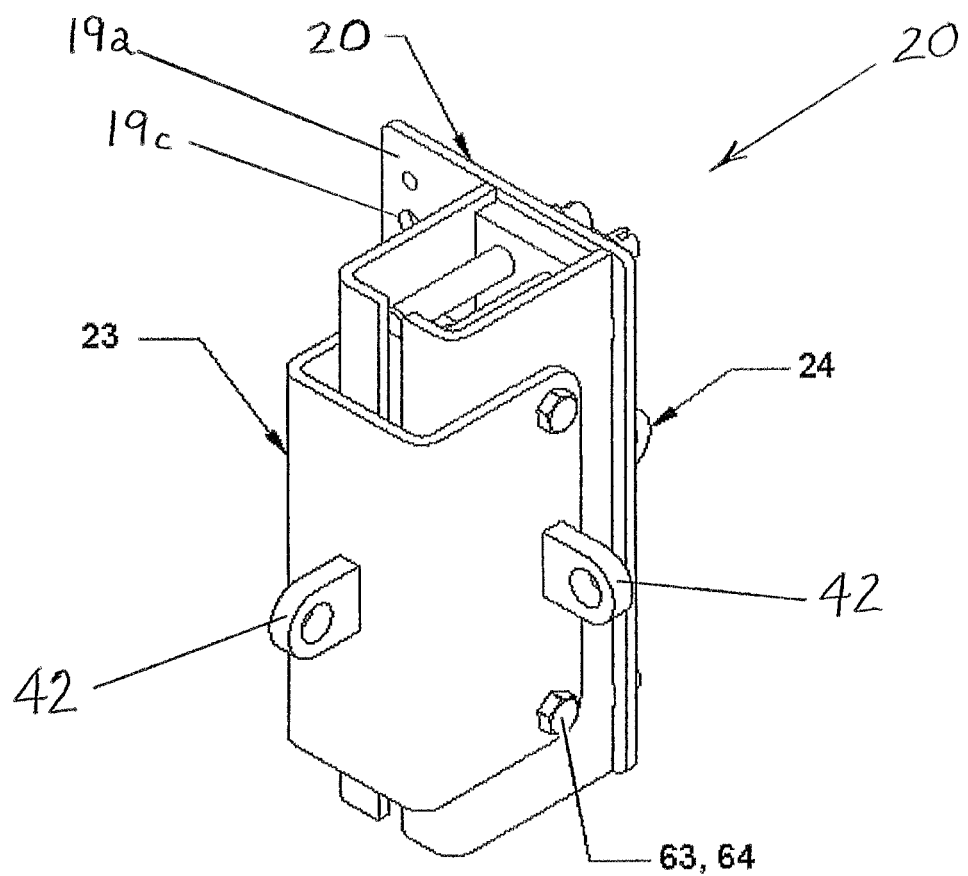
FIG. 14 is a perspective view of the Single Flange Large Series Tee Post Bracket as in FIG. 2, illustrated with accessory brace bracket and fasteners.

FIG. 10 depicts a second (or merely "another") accessory bracket 23 and accessory brackets 24 coupled to the large bracket 20 shown in FIG. 1. Accessory bracket 24 may have a linear configuration and may be attached to the flange of the large bracket 20 with fastener 63. The second accessory bracket 23 may have a U-shaped configuration that includes three panels or walls, respectively, so as to surround three sides of the large bracket 20 and may be attached to large bracket 20 with fasteners 63 and nuts 64 as shown. A clevis 42 may be mounted to each of the three panels of the accessory bracket 23 (FIG. 14). Also shown in FIG. 10 are the set screws 60 and locking nuts 62 used to secure the bracket assembly onto the t-post 100 as shown in FIG. 1. Accessory brackets 24 and 23, when attached to bracket 20 form a configuration that provides clevis attachment points on all four sides of large bracket 20. The clevis attachment points provide a means by which materials or objects can be attached to the bracket 20 with bolts or screws.

Figure 10A:
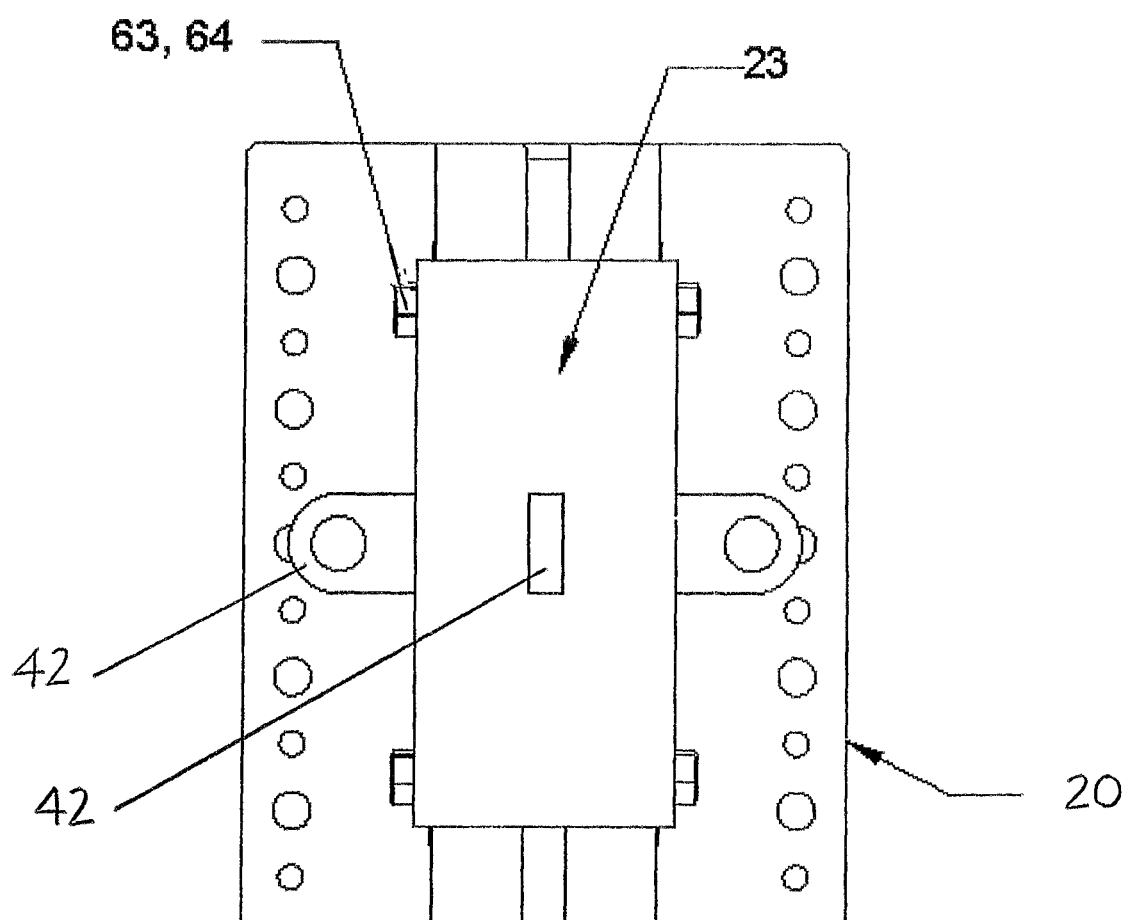
FIG. 10a is a perspective side view of the Dual Flange Large Series Tee Post Bracket as in FIG. 1, illustrated with accessory brace bracket with fasteners.
Figure 10:
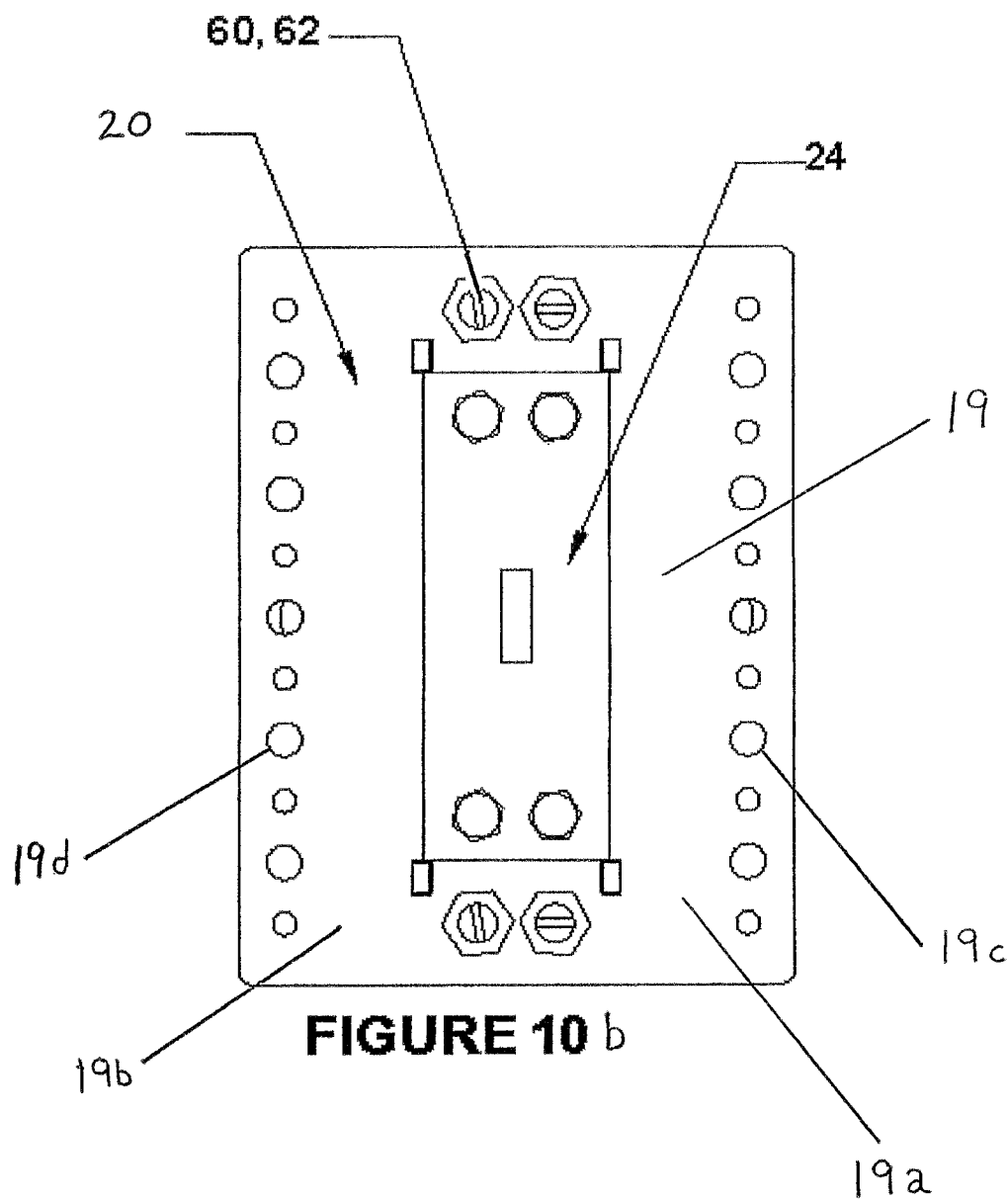

FIG. 10a depicts the components in FIG. 10 from a view from the left side of the assembly. This view shows that accessory bracket 23 has clevis attachment points on three sides and how 23 is attached to the large double-sided bracket 20 with fastener 63 and 64.

FIG. 10b depicts the components in FIG. 10 from a view from the right side of the assembly. This view shows that accessory bracket 24 has one clevis attachment point and how accessory bracket 24 is attached to the large double-sided bracket 20 with fasteners 63. Also shown in the view are the set screws 60 and locking nuts 62 used to secure the bracket assembly onto the t-post as shown in FIG. 1.

Figure 11:
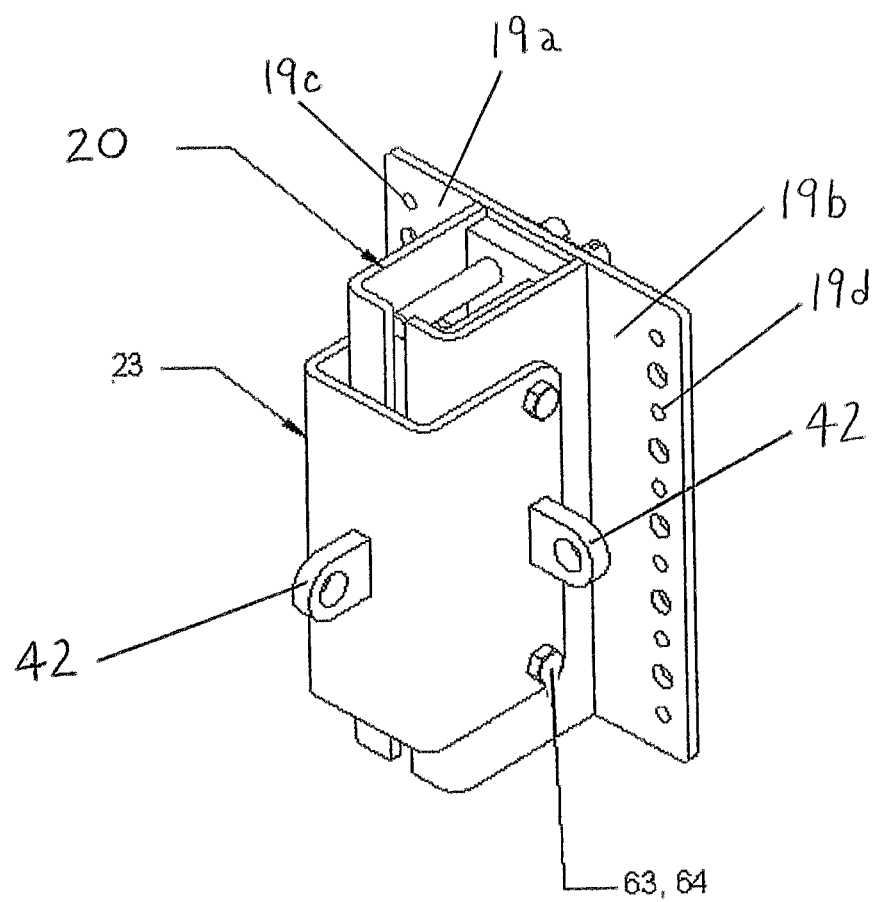
FIG. 11 is a perspective view of the Dual Flange Large Series Tee Post Bracket as in FIG. 1, illustrated with accessory brace bracket per item 23 with fasteners per items 63 and 64.

FIG. 11 depicts the configuration illustrated in FIGS. 10, 10*a*, and 10*b*, formed by the large double-sided bracket 20, accessory bracket 23, and accessory bracket 24 in a isometric view to give a three dimensional perspective of the components.

Figure 12:
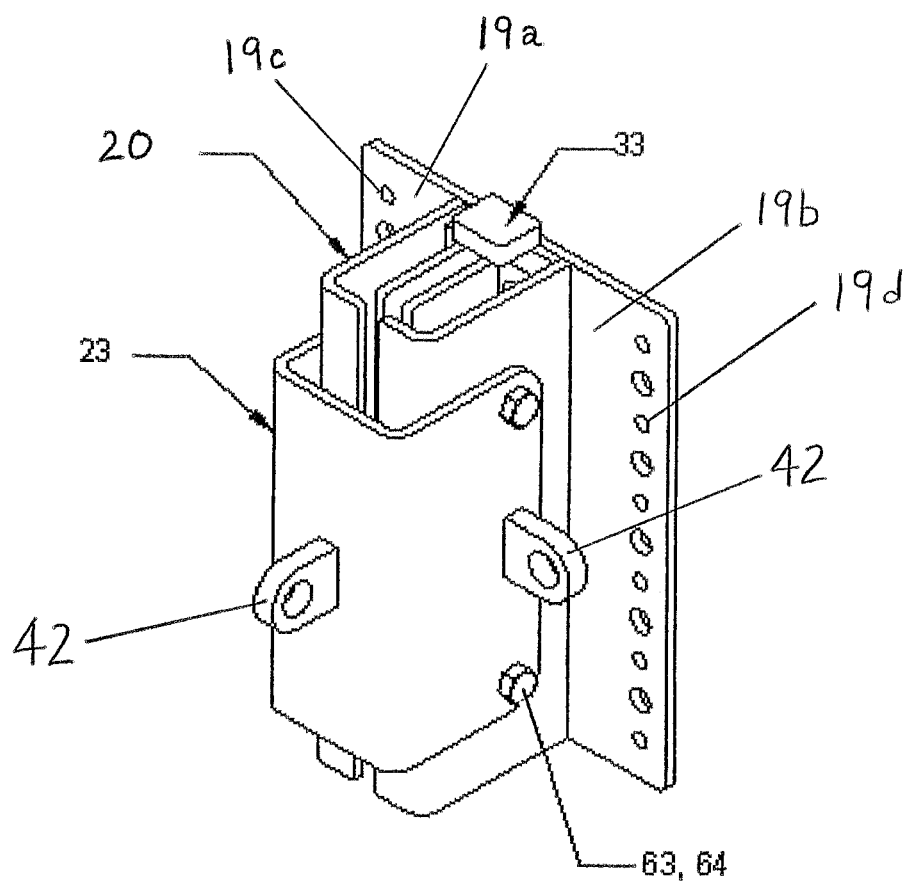
FIG. 12 is a perspective view of the Dual Flange Large Series Tee Post Bracket shown as in FIG. 1, illustrated with accessory brace bracket with fasteners and accessory Large Series Bracket Wedge.

FIG. 12 depicts the configuration illustrated in FIGS. 10, 10*a*, and 10*b*, formed by the large double-sided bracket 20, accessory bracket 23, and accessory bracket 24 in a isometric view to give a three dimensional perspective of the components. FIG. 12 shows the configuration with the option of the large wedge 33 replacing the set screws illustrated in FIGS. 10 and 11.

Figure 13:
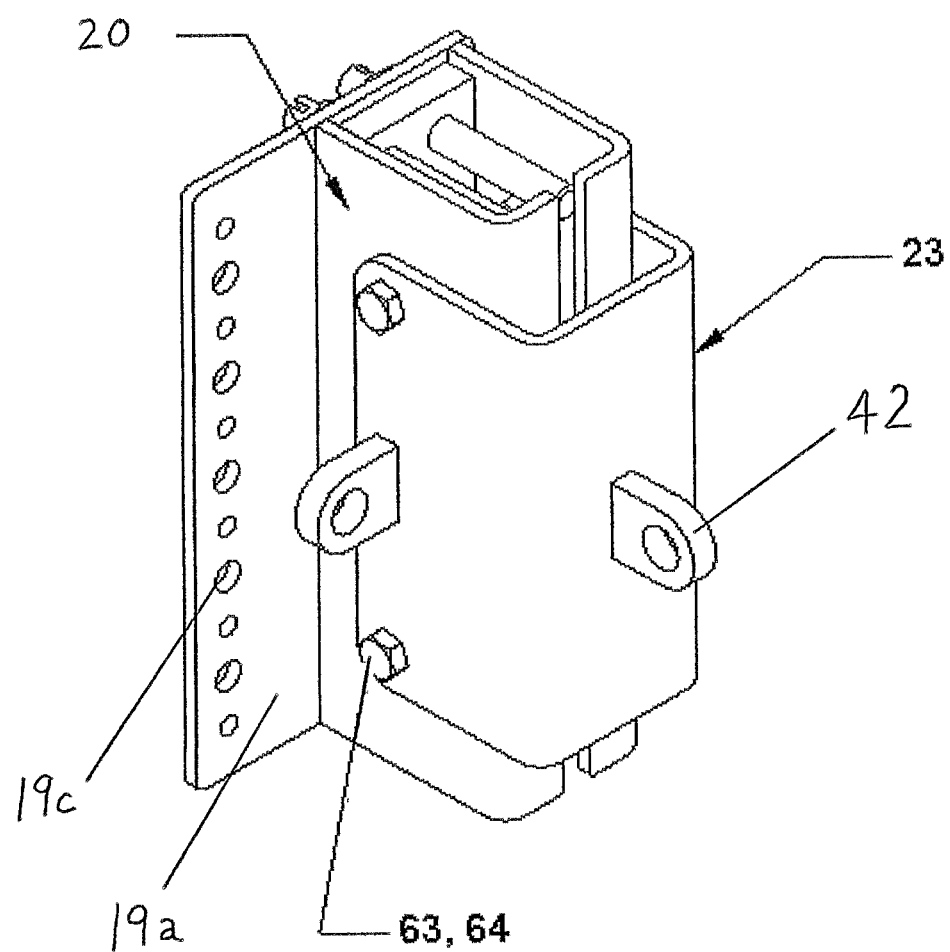
FIG. 13 is a perspective view of the Single Flange Large Series Tee Post Bracket as in FIG. 2, illustrated with accessory brace bracket with fasteners.

FIGS. 13 and 14 depict in an isometric view the configuration of the large single sided bracket with accessory bracket 23 and accessory bracket 24. The figures illustrate that the accessory brackets 23 and 24 are modular and can be attached to all three large series bracket that are shown in FIGS. 1, 2, and 3. This modularity give the large series brackets the ability to have clevis attachment points on all four sides of the bracket or t-post.

Figure 15:
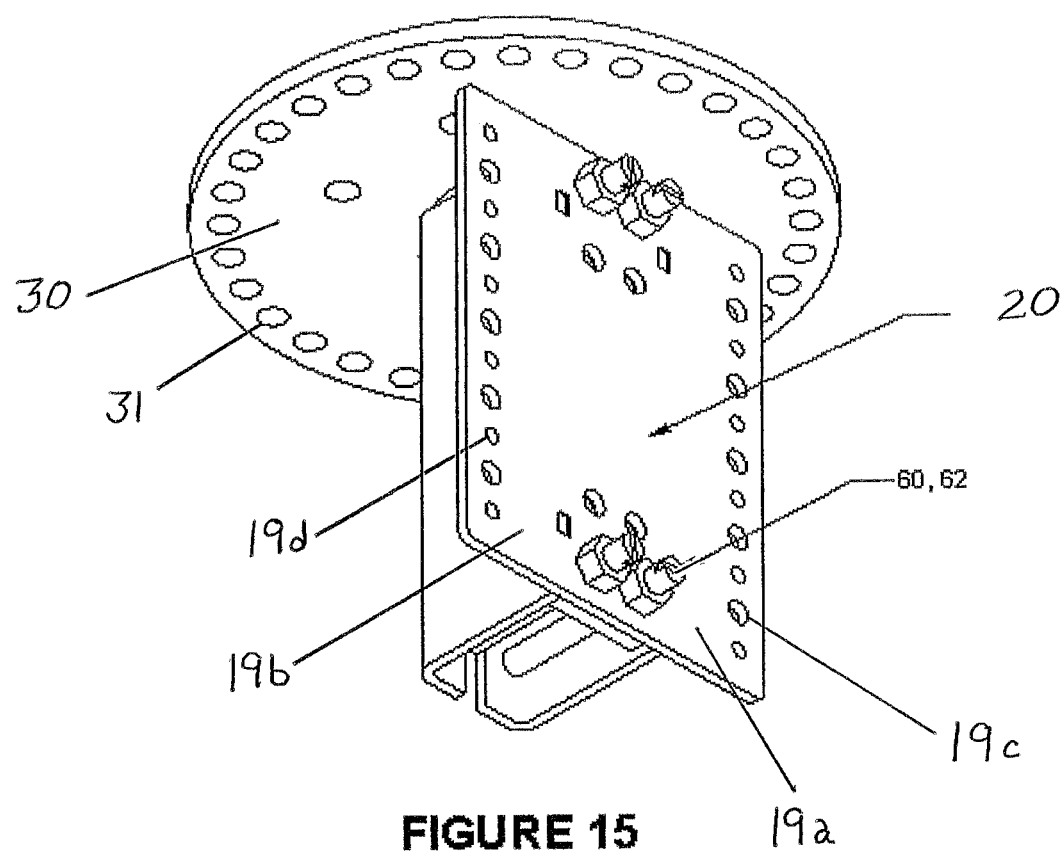
FIG. 15 is a perspective view of a Large Series Tee Post Bracket that has both dual flanges and a top flange as in FIG. 3, illustrated showing the set screws and locking nuts.

FIG. 15 depicts the large double-sided bracket shown in FIG. 3 in an isometric view. Illustrated in FIG. 15 are set screw 60 and 62, described previously. The isometric view shows that the large double-sided bracket with its circular plate 61 provides multiple hole patterns by which components, materials, and objects can attached. Specifically, additional holes are defined than shown and discussed previously.

Figure 16:
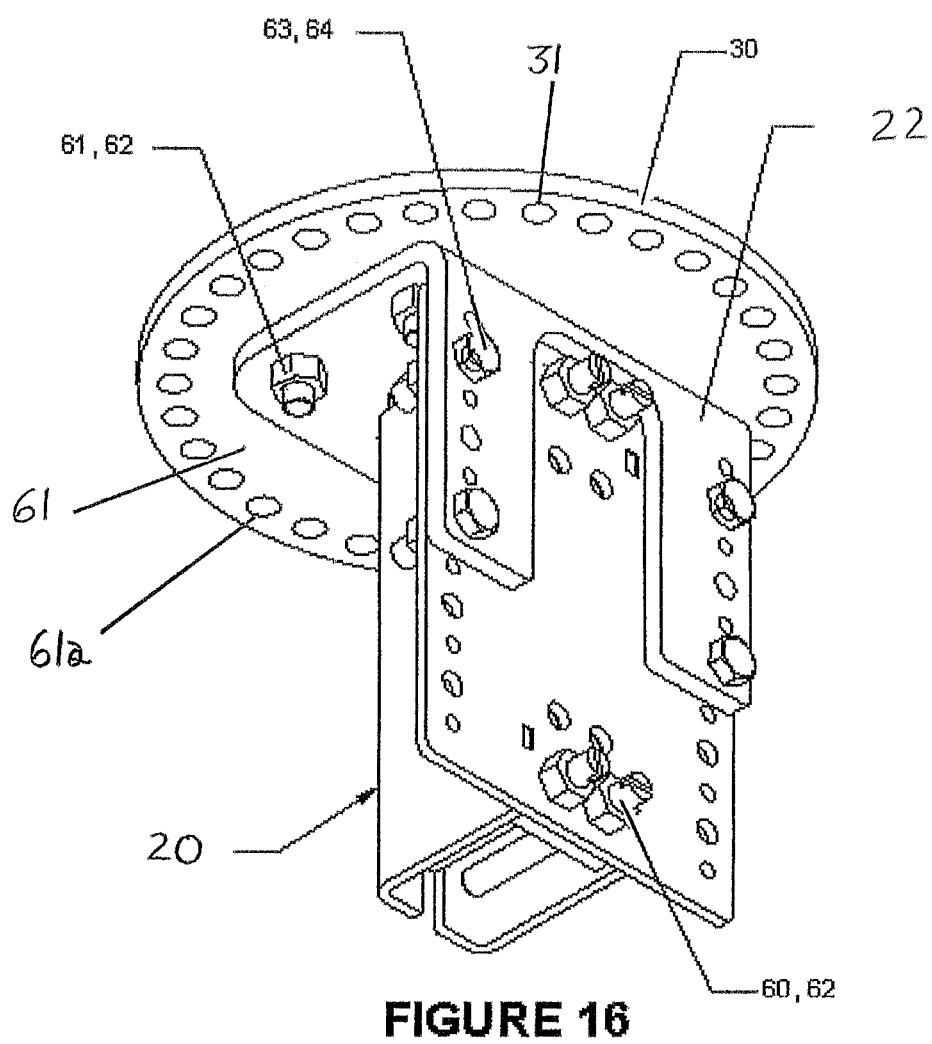
FIG. 16 is a perspective view of the Dual Flange Large Series Tee Post Bracket as in FIG. 1, illustrated with accessory 90° bracket and accessory top flange.

FIG. 16 depicts the large double-sided bracket 20 shown in FIG. 1 with attached accessory bracket 22 and accessory circular plate 30. Accessory bracket 22 is attached to large bracket 20 with fasteners 63 and fastener nut 64. Accessory plate 30 is attached to accessory bracket 20 with fastener 61 and faster nut 62. Also shown in the Figure are set screw 60 and 62. FIG. 16 illustrates the modularity of the large series bracket 20 and that multiple accessories have been invented to provide means by which components, materials, and objects can be attached.

Figure 17:
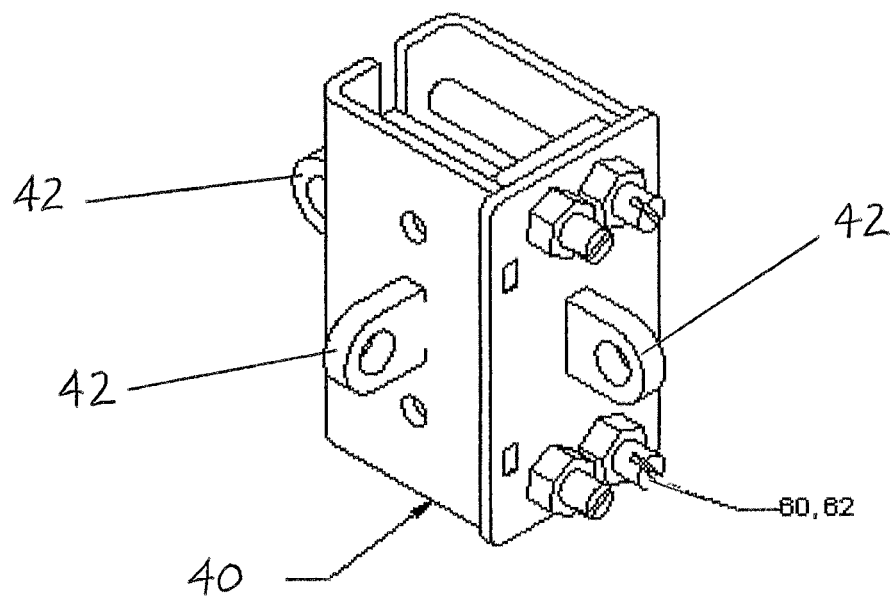
FIG. 17 is a perspective view of a Small Series Tee Post Bracket that has 4 clevis lugs, illustrated showing mounting set screws and locks.

FIG. 17 depicts the small bracket 40 shown in FIG. 4 in isometric view form. FIG. 17 and FIG. 4 show the small bracket with clevis attachment points on all four sides of the bracket. The clevis attachment points provide a means by which components, materials, and objects can be attached to the bracket with bolts or screws.

Figure 18:
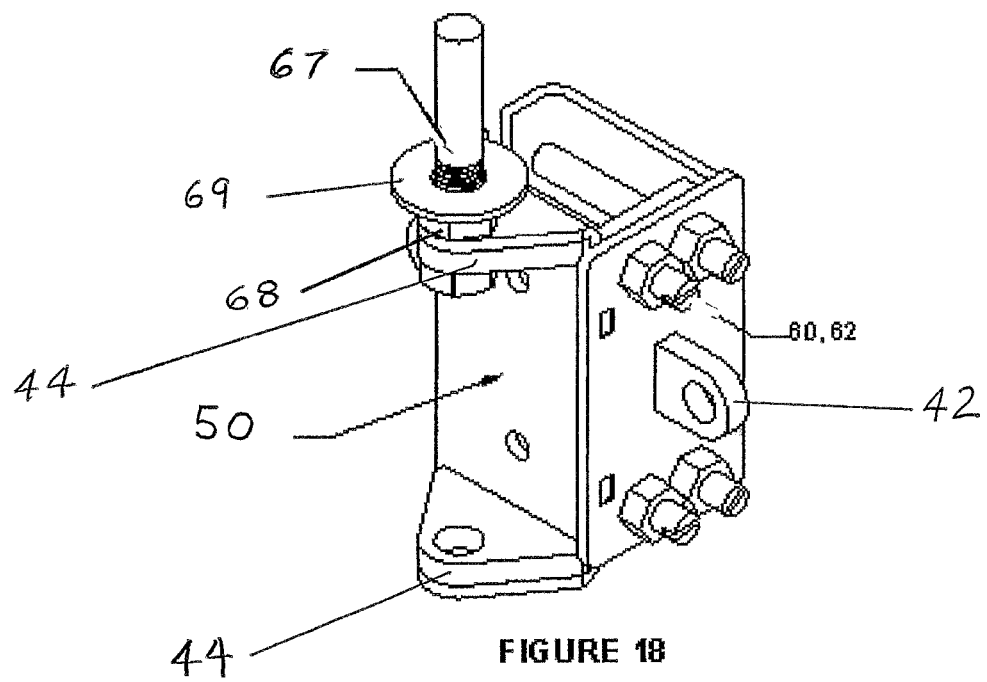
FIG. 18 is a perspective view of a Small Series Tee Post Bracket that has 3 clevis lugs and one side having dual horizontal flanges, illustrated showing accessory fastener hardware assembled to the bracket.
Figure 19:
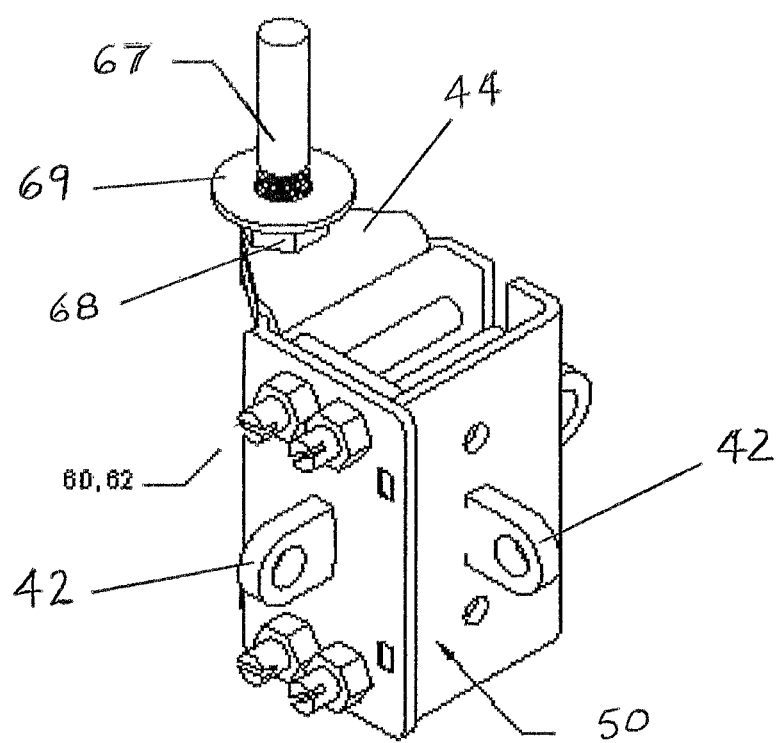
FIG. 19 is a perspective view of a Small Series Tee Post Bracket that has 3 clevis lugs and one side having dual horizontal flanges, illustrated to show accessory fastener hardware assembled to the bracket.

FIGS. 18 and 19 depict the modified small bracket 50 shown in FIG. 5 configured with additional fastener 67, fastener nut 68, and washer 69 attached to one attachment flange 44 of the bracket. The configuration of bracket 50 with its clevis attachment points on three sides and its two flanges on the remaining side provide a means by which components, materials, and objects can be attached. The configuration of FIGS. 18 and 19 with the fasteners 67, 68, and 69 in a field fence application can serve to function as a hinge for standard available field fence gates. Examples of the FIGS. 18 and 19 configuration used as a hinge can be seen in the applications shown in FIGS. 27, 28, and 29.

Figure 20B:
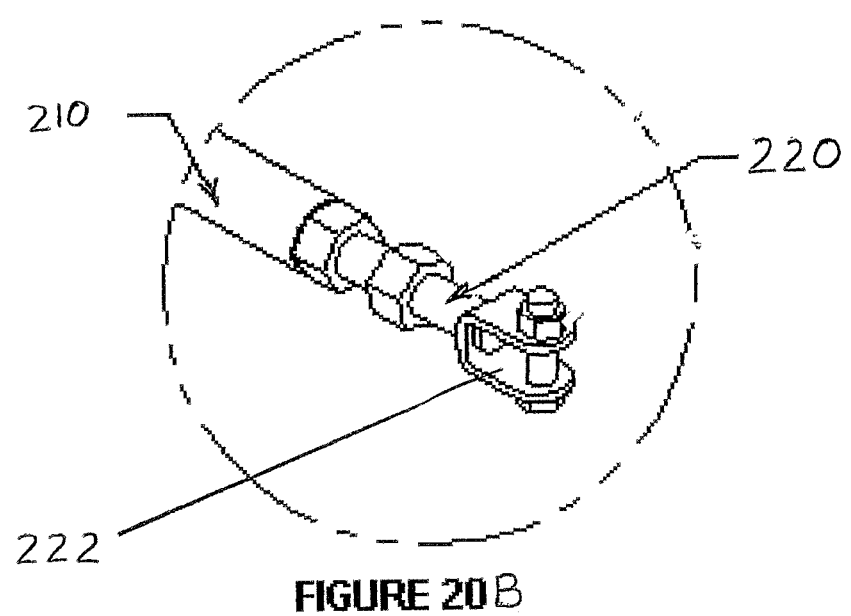
FIG. 20B is an isolated view on an enlarged scale taken from FIG. 20A.

FIGS. 20A, and 20B illustrate the adjustable brace assembly 200 in both its retracted and extended length configurations. The adjustable brace assembly 200 is made up of two weldments: a tubular assembly 210 and the threaded rod assembly 220. The adjustable brace assembly 200 is assembled by threading the threaded rod assembly 220 into the tubular assembly 210 which itself is threaded. The adjustable brace assembly 200 changes length by screwing the threaded rod assembly 220 into and out of the tubular assembly 210. As shown in FIG. 20A both the tubular assembly 210 and threaded rod assembly 220 are fabricated with a double clevis 222 on one end of each respective weldment. This feature when assembled together into the adjustable brace assembly 200 provides a double clevis 222 on each end where by each double clevis 222 can be used to attach to the single clevis attachment points shown in FIGS. 4, 5, and 6 as well as configurations of the large bracket 20 shown in FIGS. 10 thru 14. As illustrated in FIG. 20C, the double clevis 222 of the adjustable brace assembly 200 and the single clevis 42 of a respective bracket can be pinned together using fastener 65 and fastener nut 66. Applications where the adjustable brace assembly 200 are used can be seen in FIGS. 21, 23, 24, 26, 27, and 29.

Figure 21:
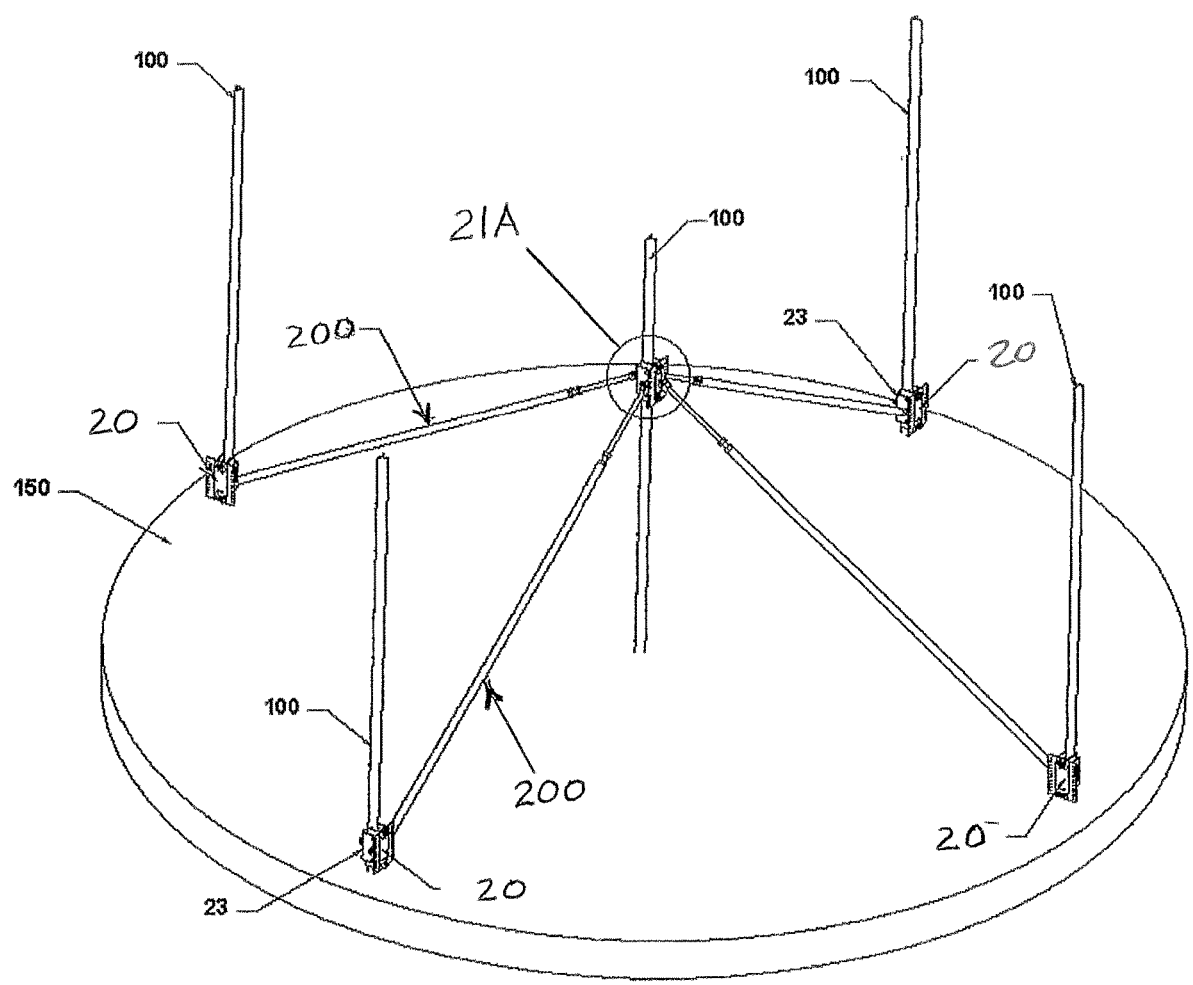
FIG. 21 is an isolated view on an enlarged scale taken from Figure the perspective view illustrating the use of a Large Series Tee Post Bracket Assembly as in FIG. 11 on each of the 4 outer Tee Posts and the use of a Large Series Tee Post Bracket Assembly as in FIG. 10 on the center Tee Post. The perspective view illustrates the use Adjustable Brace Assemblies as shown in FIGS. 20a, 20b.
Figure 21A:
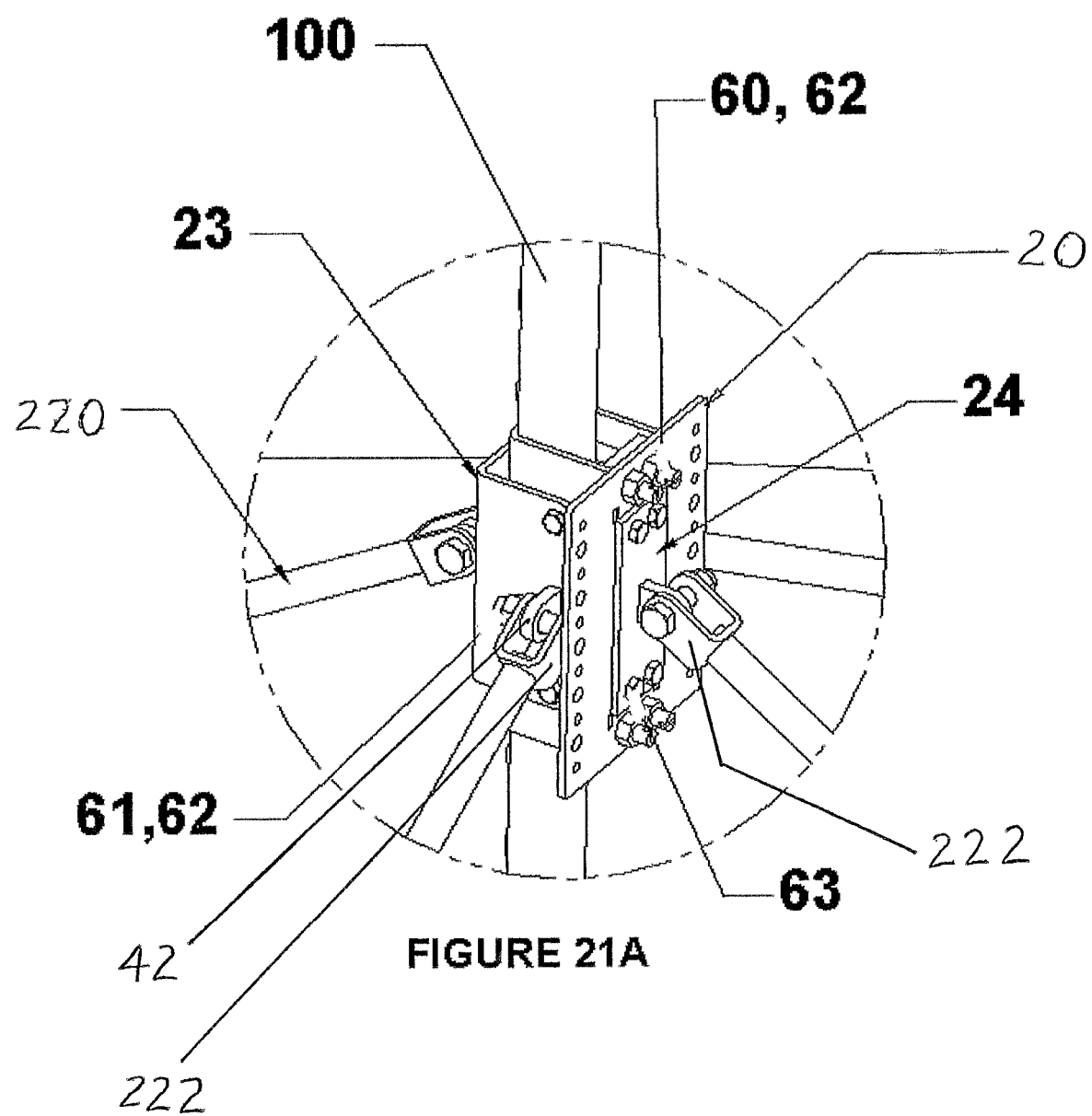
FIG. 21A is an isolated view on an enlarged scale taken from FIG. 21 showing how the four Adjustable Brace Assemblies connect to the Tee Post Bracket on the center Tee Post illustrated in FIG. 21.

FIG. 21 and FIG. 21A depict a typical field fence application where two fences cross and a corner post is required. FIGS. 21 and 21A illustrate how components of the present fencing system are used to create a sturdy and secure field fence corner. In the center of the Figure where the fences would intersect stands a t-post 100. Secured on this t-post is large bracket 20 configured with accessory brackets 23 and 24 as shown in FIG. 10 and FIG. 11. Secured towards the bottom of each of the other t-posts is again bracket 20 with accessory bracket 23. As shown in FIG. 21 adjustable braces 200 are used to support the corner t-post by adjusting to a required length and pinning the double devises 202 on each end of the adjustable brace to the single devises provided on the t-post bracket assemblies. FIG. 21A illustrates the connections made between the adjustable brace assembly 200 and a respective bracket (in this case attachment of the double clevis 222 and clevis 42 using fasteners 61 and 62.

Figure 22:
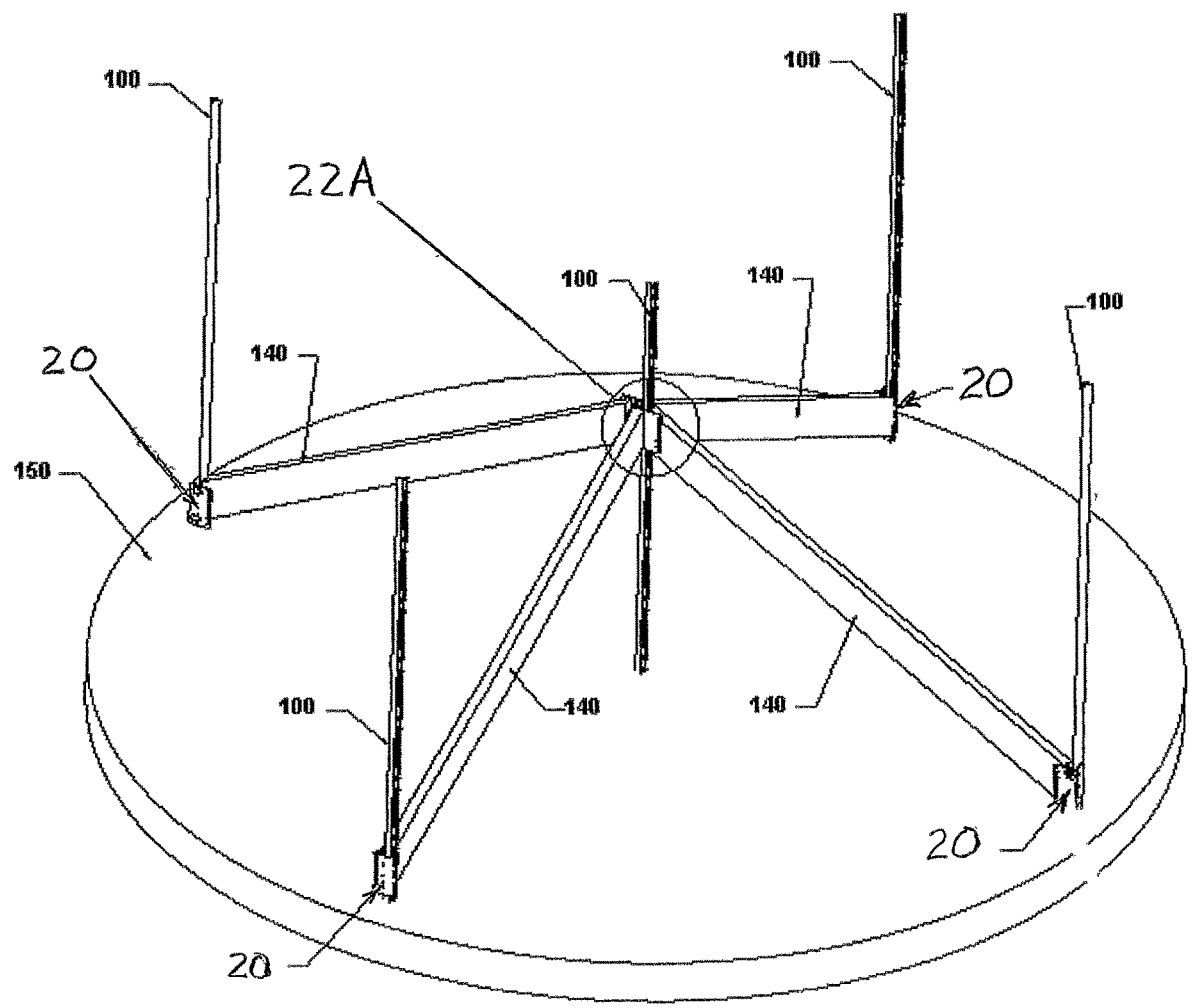
FIG. 22 is a perspective view of a fence corner where two fence lines cross at an approximate 90° angle, the perspective view illustrating the use of a Large Series Tee Post Bracket Assembly as in FIG. 2 on each of the 4 outer Tee Posts and the use of a Large Series Tee Post Bracket Assembly as in FIG. 8 on the center Tee Post. The perspective view illustrates the use of wooden braces according to the present invention.
Figure 22A:
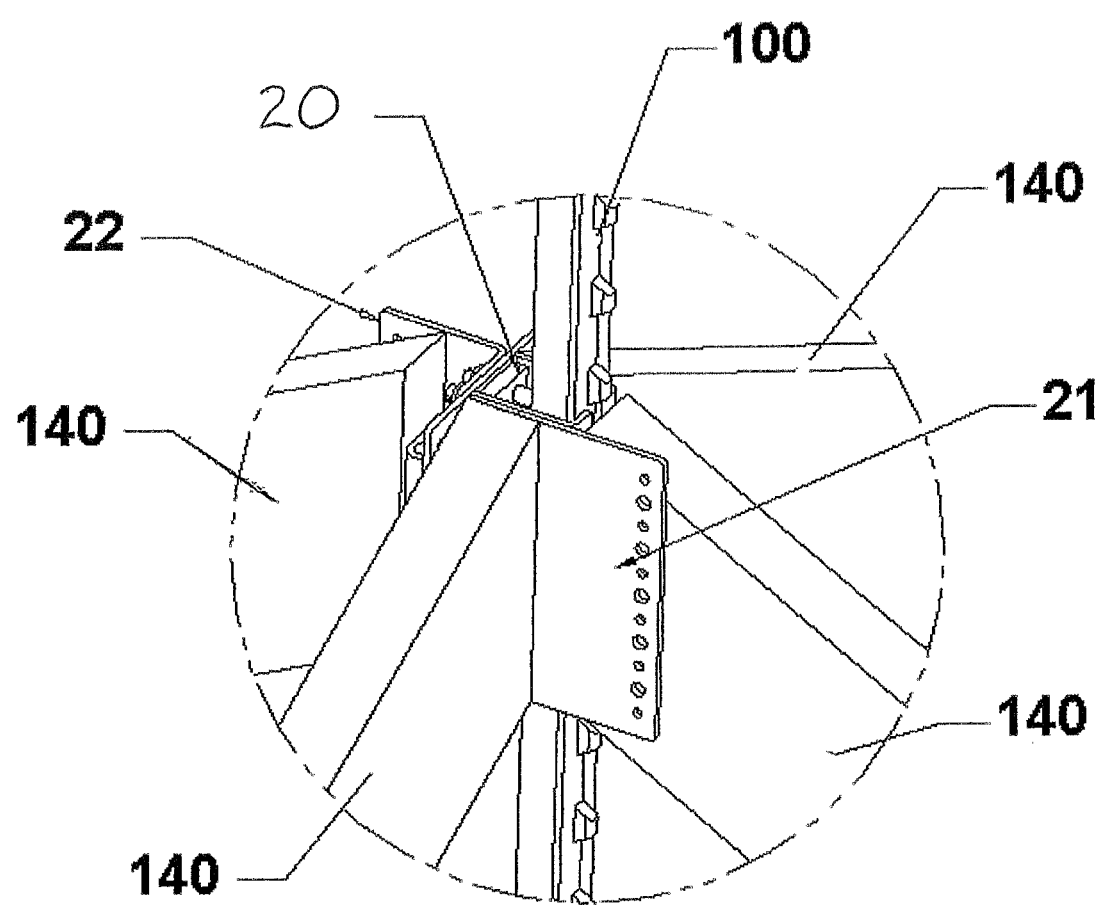
FIG. 22A is an isolated view on an enlarged scale taken from FIG. 22, showing how the 4 wooden braces connect to the Tee Post Bracket on the center Tee Post as in FIG. 22.

FIG. 22 and FIG. 22A depict a typical field fence application where two fences cross and form a corner about the t-post 100 in the center. FIGS. 22 and 22A illustrate how components of the present invention are used to create a sturdy and secure field fence corner post using a standard t-post. In the center of the figure where the fences would intersect stands a t-post 100. Secured on this t-post 100 is configured with accessory brackets 21 and 22 as shown in FIG. 8. Secured towards the bottom of each of the other t-posts is the modified bracket shown in FIG. 2. As shown in FIG. 22, wood braces 140 are used to support the corner t-post 100. To support the center t-post each wood brace 140 is cut to fit such that it can be attached with screws or bolts through the respective hole patterns provided for attachment. It is important to note that FIG. 22 depicts a wooden brace 140 which would be most economical and easily cut to fit with a hand or chainsaw which are generally standard equipment for farm field fencing. It is also important to note that the brace material could be any material chosen by the installer that is capable of being fastened to the brackets by bolt or screw.

Figure 23:
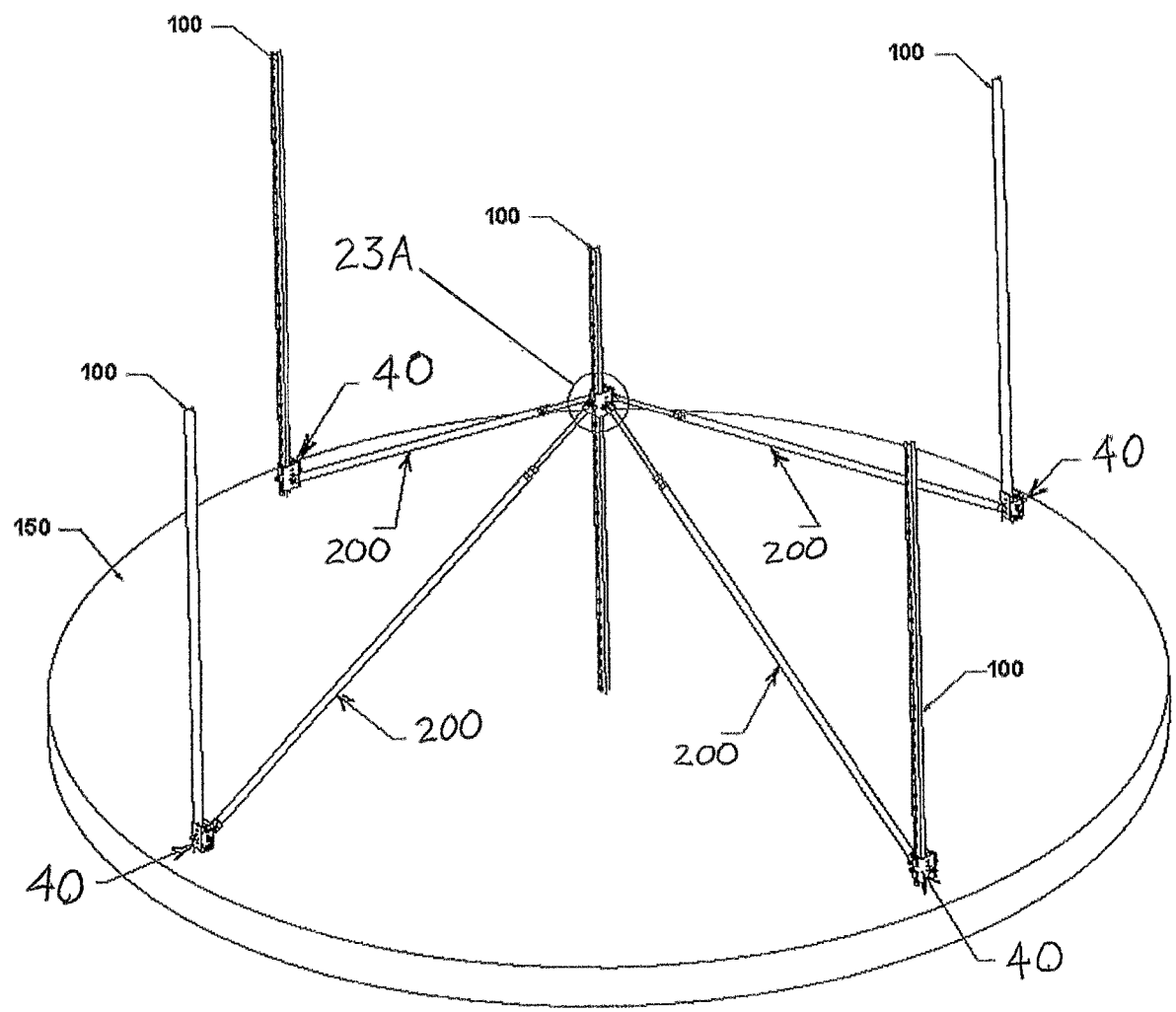
FIG. 23 is a perspective view of a fence corner where two fence lines cross at an approximate 90° angle, illustrating the use of a Small Series Tee Post Bracket Assembly as in FIG. 4 on each of the 4 outer Tee Posts and the use of a Small Series Tee Post Bracket Assembly as in FIG. 4 on the center Tee Post. The perspective view illustrates the use Adjustable Brace Assemblies illustrated in FIGS. 20a and 20b.
Figure 23A:
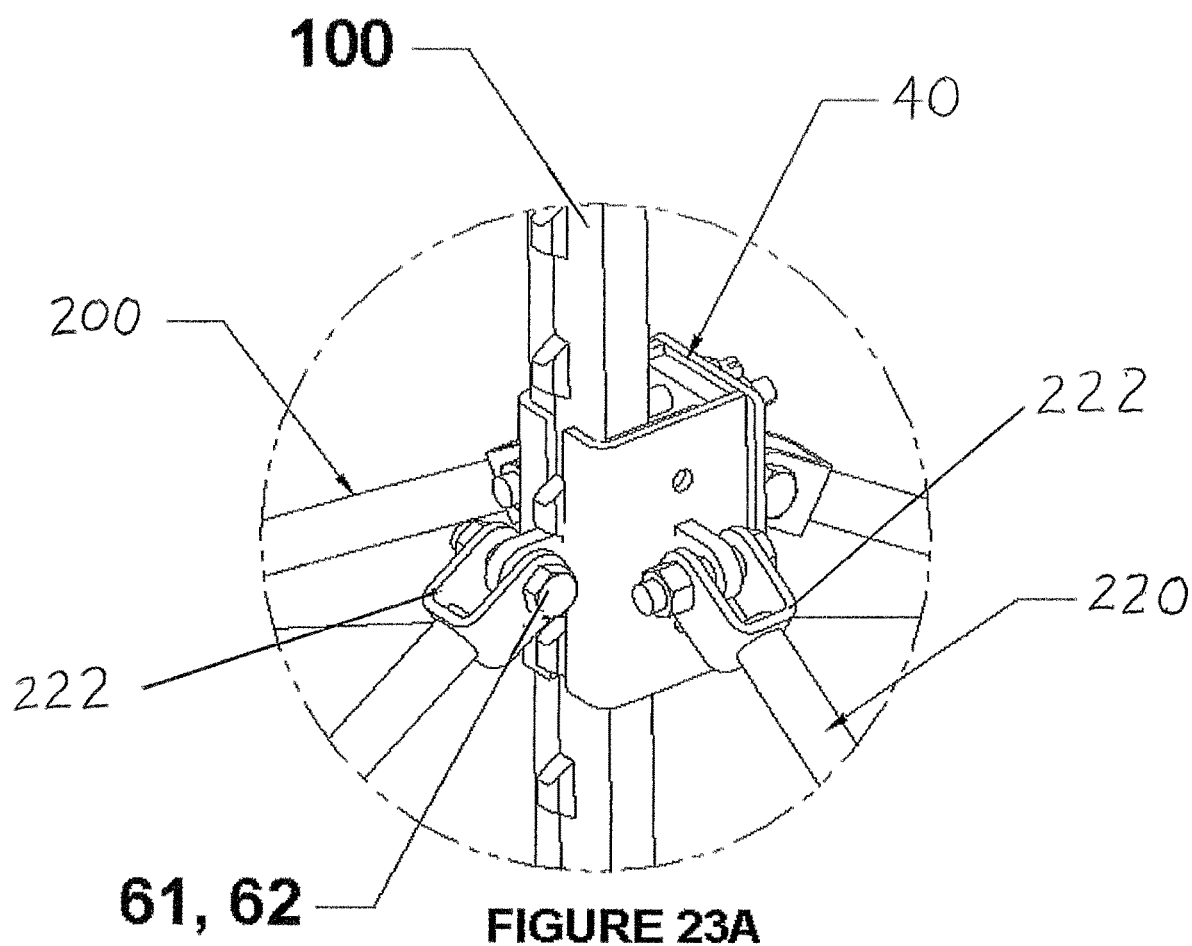
FIG. 23A is an isolated view on an enlarged scale taken from FIG. 23 showing how the 4 Adjustable Brace Assemblies connect to the Tee Post Bracket on the center Tee Post in FIG. 23.

FIG. 23 and FIG. 23A depict a typical field fence application where two fences cross and a corner post is required. FIGS. 23 and 23A illustrate how components of the present invention are used to create a sturdy and secure field fence corner post using a standard t-post 100. In the center of the illustration where the fences would intersect stands a t-post 100. Secured on this t-post is bracket 40. As shown in FIG. 21 adjustable brace assemblies 200 are used to support the corner t-post by adjusting to a required length and pinning the double devises on each end of the adjustable brace to the single devises provided on the t-post bracket assemblies.

FIG. 23A illustrates the connections made between the adjustable brace and the bracket assembly using fastener 61 and 62.

Figure 24:
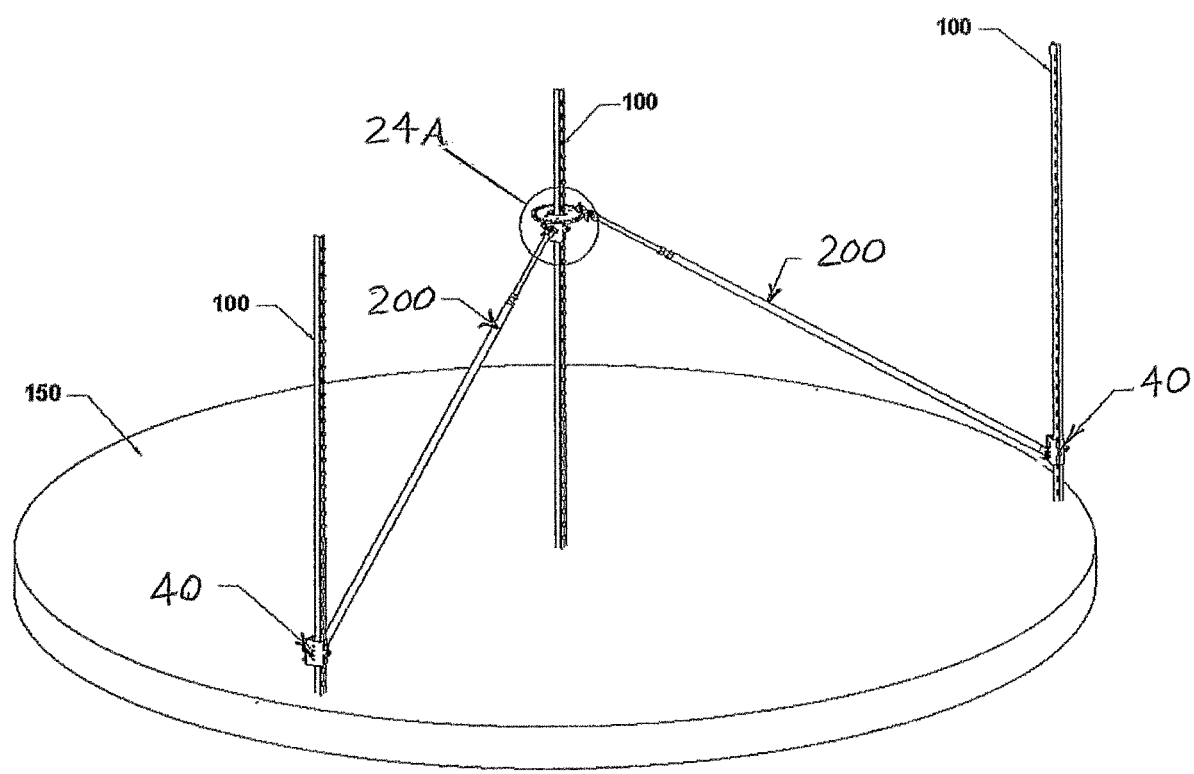
FIG. 24 is a perspective view of a fence corner where two fence lines intersect at an angle not considered to be approximately 90°, illustrating the use of a Small Series Tee Post Bracket Assembly as in FIG. 4 on each of the two outer Tee Posts and the use of a Small Series Tee Post Bracket Assembly as in FIG. 6 on the center Tee Post. The perspective view illustrates the use Adjustable Brace Assemblies shown in FIGS. 20a and 20b.
Figure 24A:
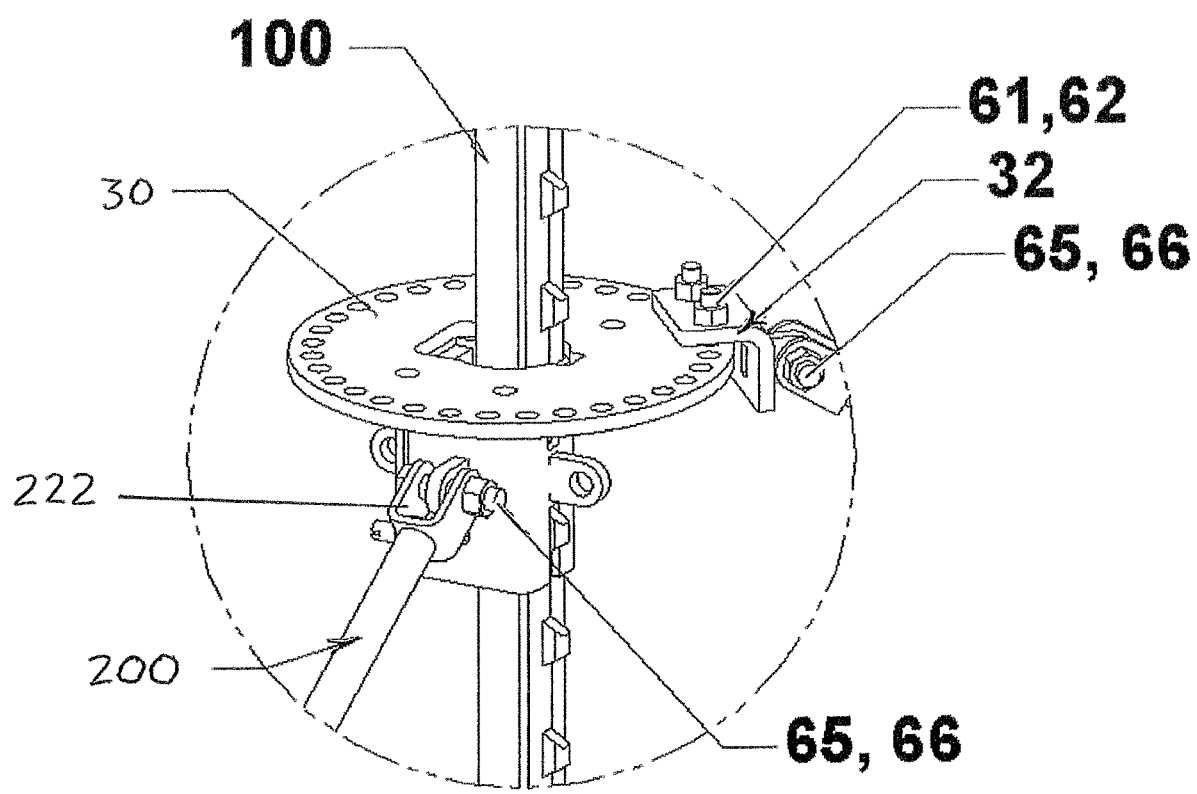
FIG. 24A is an isolated view on an enlarged scale taken from FIG. 24, showing how the two Adjustable Brace Assemblies connect to the Tee Post Bracket on the center Tee Post in FIG. 24. The detail view shows the use of the accessory odd angle clevis option brace bracket.

FIG. 24 and FIG. 24A depict a typical field fence application where two fences intersect and a corner post is required. In the illustrated application the intersecting fences are not at a 90° to each other but rather are at an angle of about 135°. It is important to note that the illustration is created to demonstrate how fence intersections that are not at 90° can be accommodated by using a standard t-post as a corner post by making use of components of the present invention. The t-post bracket shown on the corner post is bracket 50 illustrated in FIG. 5. In the illustration one fence intersection is in line with one side of the bracket 50. This side is braced using the adjustable brace assembly 200. Adjustable brace assembly 200 is pinned to the bracket 50 as shown in FIG. 24A and to bracket 40 secured to the bottom of the t-post 20 on the left side of the view. The attachment of both ends of the adjustable brace assembly 200 is completed by pinning the adjustable brace double clevis 222 to the respective t-post brackets single clevis with fastener 65 and 66. The brace that is at other than 90° angle to the t-posts sides is accommodated by making use of the accessory bracket 32 shown in FIG. 24A. Accessory bracket 32 is designed to attach to the circular plate radial hole pattern providing a means to align the bracing to the angle of the other than 90° fence intersection. In this application and bracing configuration, the double clevis 222 of the adjustable brace assembly 200 is pinned to the single clevis of the 32 accessory brackets. The other end of the adjustable bracket is pinned to t-post bracket secured near the bottom of the adjacent positioned t-post. The devises are pinned with fastener 65 and 66.

Figure 25:
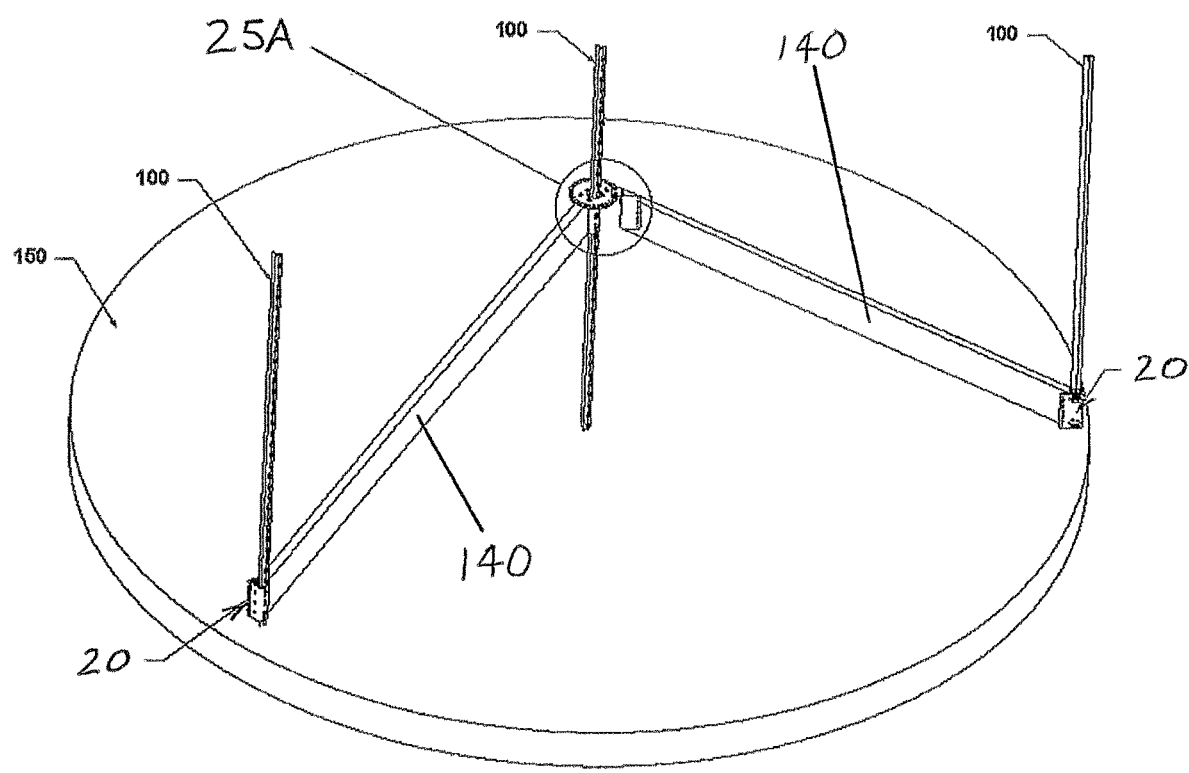
FIG. 25 is a perspective view of a fence corner where two fence lines intersect at an angle not considered to be approximately 90°, illustrating the use of a Large Series Tee Post Bracket Assembly as in FIG. 2 on each of the two outer Tee Posts and the use of a Large Series Tee Post Bracket Assembly per FIG. 16 on the center Tee Post. The perspective view illustrates the use of wooden braces.
Figure 25A:
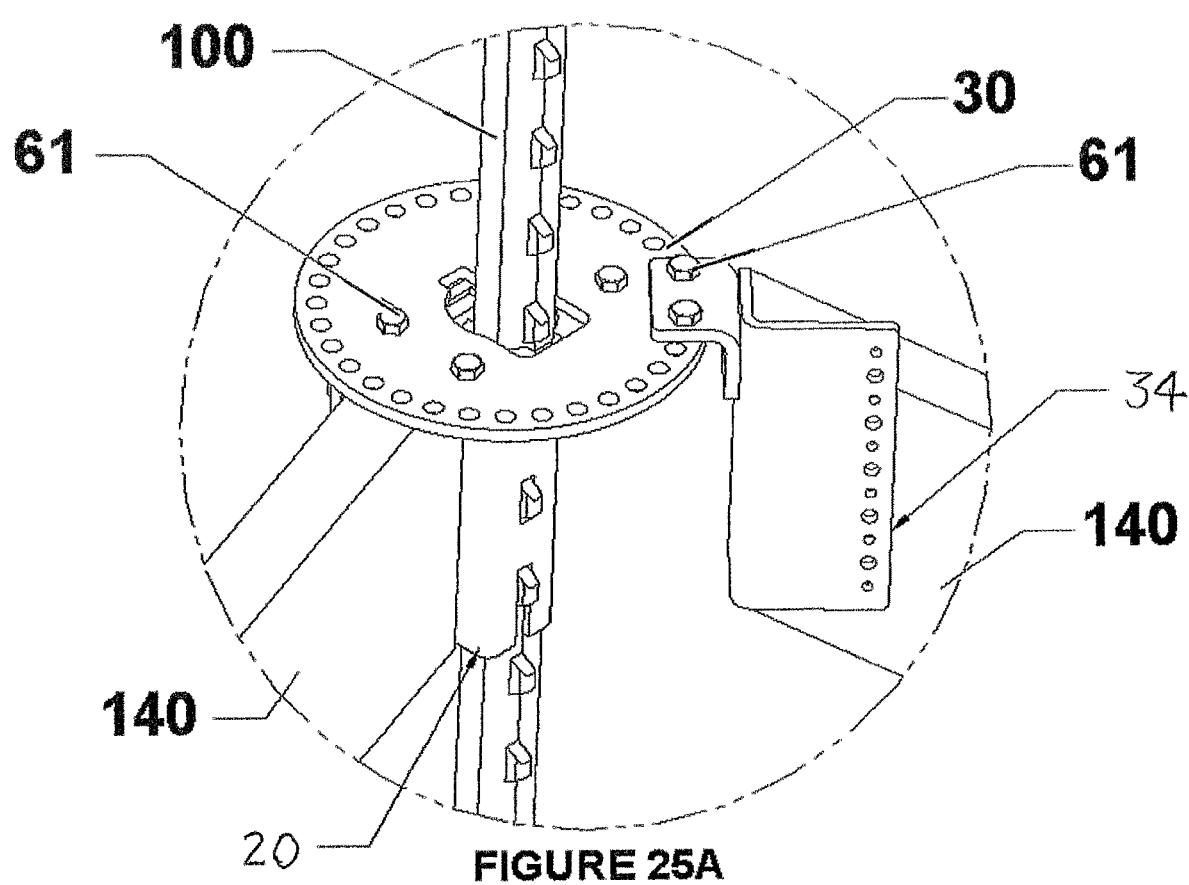
FIG. 25A is an isolated view on an enlarged scale taken from FIG. 25, showing how the two wooden braces connect to the Tee Post Bracket on the center Tee Post in FIG. 25. The detail view shows the use of the accessory odd angle wood option brace bracket.

FIG. 25 and FIG. 25A depict a typical field fence application where two fences intersect and a corner post is required. In the illustrated application the intersecting fences are not at a 90° to each other but rather are at an angle of about 135°. It is important to note that the illustration is created to demonstrate how fence intersections that are not at 90° can be accommodated by using a standard t-post as a corner post by making use of components of the present invention. In FIG. 25 the corner post is shown at the center and identified as 100. The t-post bracket shown on the corner post is bracket 20 illustrated in FIG. 3. In the illustration one fence intersection is in line with one side of the large bracket 20. This side is braced using a wood brace 140. The wood brace 140 is screwed or bolted to the bracket as shown in FIG. 25A and to bracket 20 secured to the bottom of the t-post 100 on the left side of the view. The brace that is at other than 90° angle to the t-posts sides is accommodated by making use of the accessory plate 21 shown in FIG. 25A. Accessory plate 21 is designed to attach to the circular plate radial hole pattern providing a means to align the brace to the angle of the other than 90° fence intersection. In this application the wooden bracing is screwed or bolted through the hole patterns provided in accessory plate 21 and bracket 20.

Figure 26:
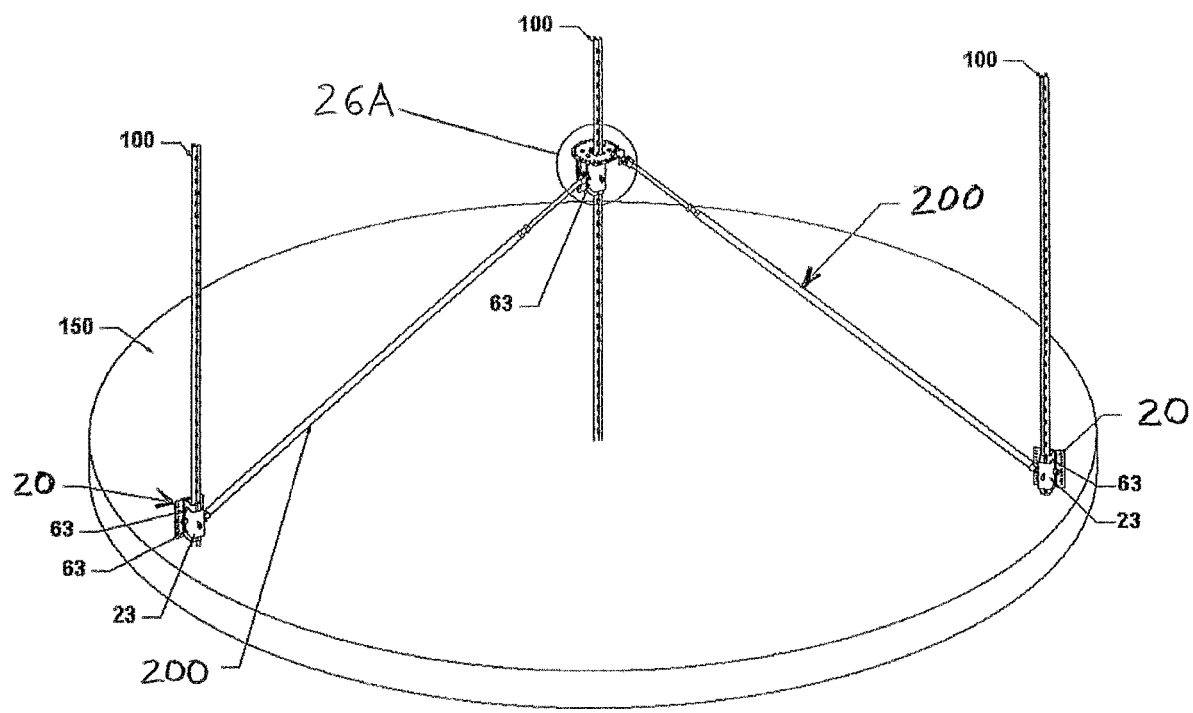
FIG. 26 is a perspective view of a fence corner where two fence lines intersect at an angle not considered to be approximately 90°, illustrating the use of a Large Series Tee Post Bracket Assembly as in FIG. 11 on each of the two outer Tee Posts. The perspective view illustrates the use of a Large Series Tee Post Bracket Assembly as in FIG. 16 on the center Tee Post with the added Brace Bracket Accessory. The perspective view illustrates the use Adjustable Brace Assemblies as in FIGS. 20a and 20b.
Figure 26A:
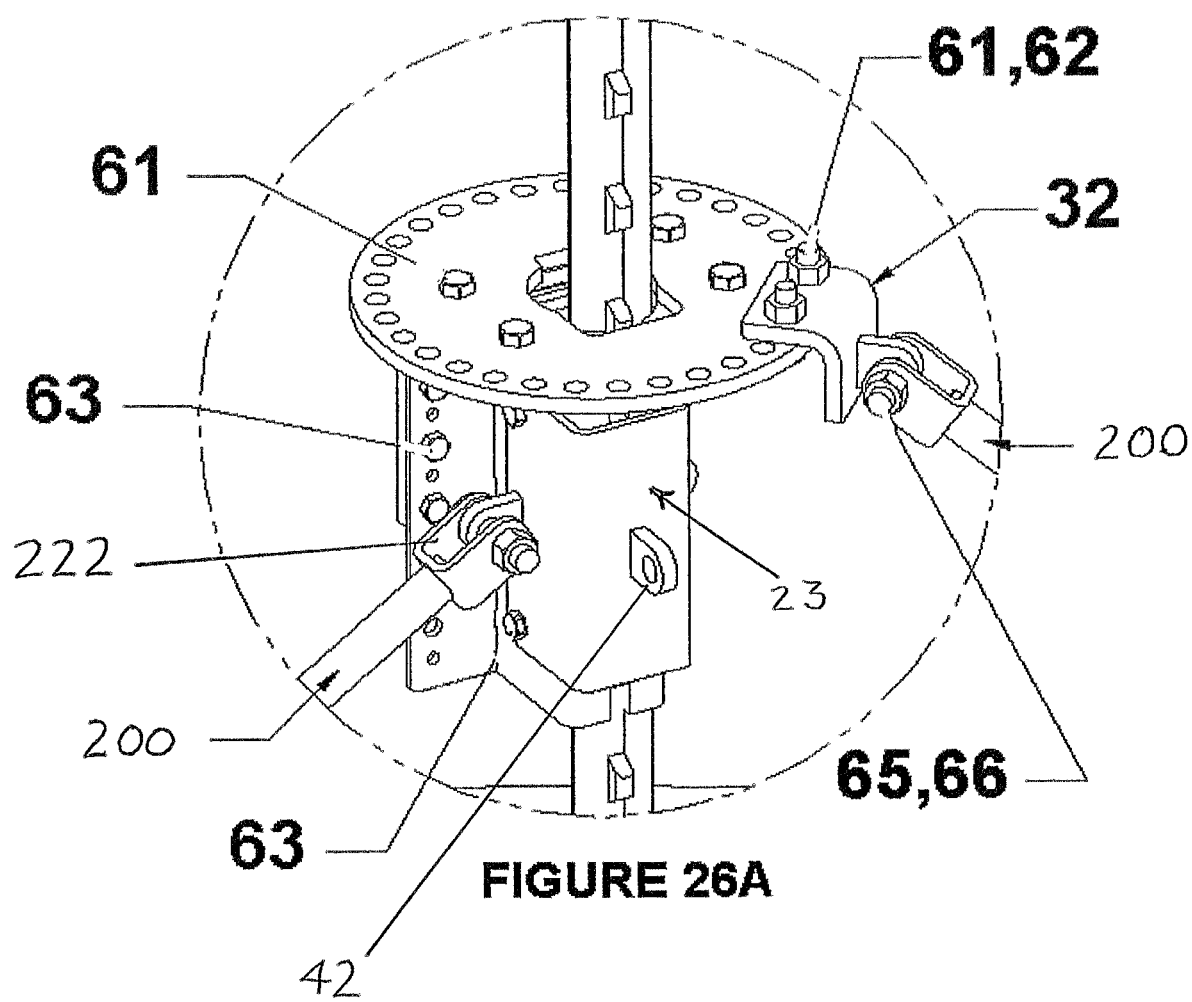
FIG. 26A is an isolated view on an enlarged scale taken from FIG. 26 showing how the 2 Adjustable Brace Assemblies connect to the Tee Post Bracket on the center Tee Post as in FIG. 26. The detail view shows the use of the accessory odd angle clevis option brace bracket.

FIG. 26 and FIG. 26A depict a typical field fence application where two fences intersect and a corner post is required. In the illustrated application the intersecting fences are not at a 90° to each other but rather are at an angle of about 135°. It is important to note that the illustration is created to demonstrate how fence intersections that are not at 90° can be accommodated by using a standard t-post as a corner post by making use of components of the present invention. In FIG. 26 the corner post is shown at the center and identified as 100. The t-post bracket shown on the corner post is large bracket 20 illustrated in FIG. 1 and configured with accessory bracket 22 and accessory plate 30 shown in FIG. 16 and accessory bracket 23 shown FIG. 11. In the illustration one fence intersection is in line with one side of the large bracket 20. This side is braced using the adjustable brace assembly 200. The adjustable brace assembly 200 is pinned to the large bracket 20 as shown in FIG. 25A and to bracket 20 with accessory bracket 23 secured to the bottom of the t-post on the left side of the view. The attachment of both ends of the adjustable brace is completed by pinning the adjustable brace double clevis 222 to the respective t-post brackets single clevis with fastener 65 and 66. The brace that is at other than 90° angle to the t-post sides is accommodated by making use of the accessory bracket 32 shown in FIG. 25A. Accessory bracket 32 is designed to attach to the circular plate radial hole pattern providing a means to align the bracing to the angle of the other than 90° fence intersection. In this application and bracing configuration the double clevis 222 of the adjustable brace assembly 200 is pinned to the single clevis of the accessory brackets. The other end of the adjustable bracket is pinned to t-post bracket and secured near the bottom of the adjacent positioned t-post. The devises are pinned with fastener 65 and 66.

Figure 27:
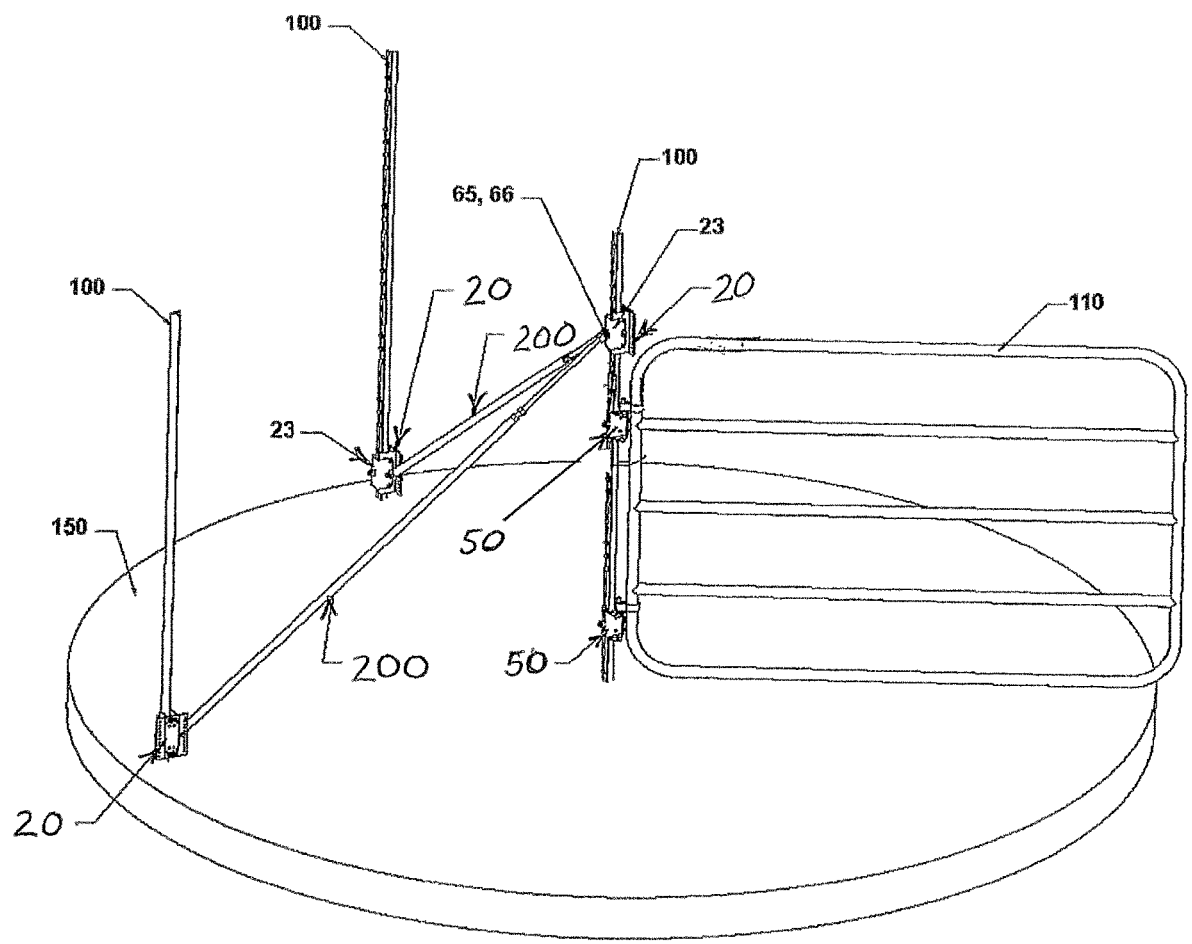
FIG. 27 is a perspective view of a fence corner where two fence lines intersect and where a gate is supported on the corner post, illustrating the use of a Large Series Tee Post Bracket Assembly as in FIG. 11 on each of the two outer Tee Posts. The perspective view also illustrates the use of a Large Series Tee Post Bracket Assembly as in FIG. 11 at the top of the center Tee Post. The perspective view illustrates the use Adjustable Brace Assemblies as shown in FIGS. 20a and 20b. The perspective view shows the use of two Small Series Tee Post Bracket Assemblies shown in FIGS. 18 and 19 secured to the Tee Post providing a hinge for the gate.

FIG. 27 depict a typical field fence application where a corner post and gate is required. FIG. 27 illustrates how components of the present invention are used to create a sturdy and secure field fence corner post capable of accommodating and supporting standard field fence gates 110. This bracket in this illustration serves to provide a means to brace the corner post with adjustable brace assembly 200. Also located on the corner post are two brackets 50. These brackets are configured as illustrated in FIGS. 18 and 19. The brackets serve as hinges to attach and support the gate 110 at the top and bottom.

Figure 28:
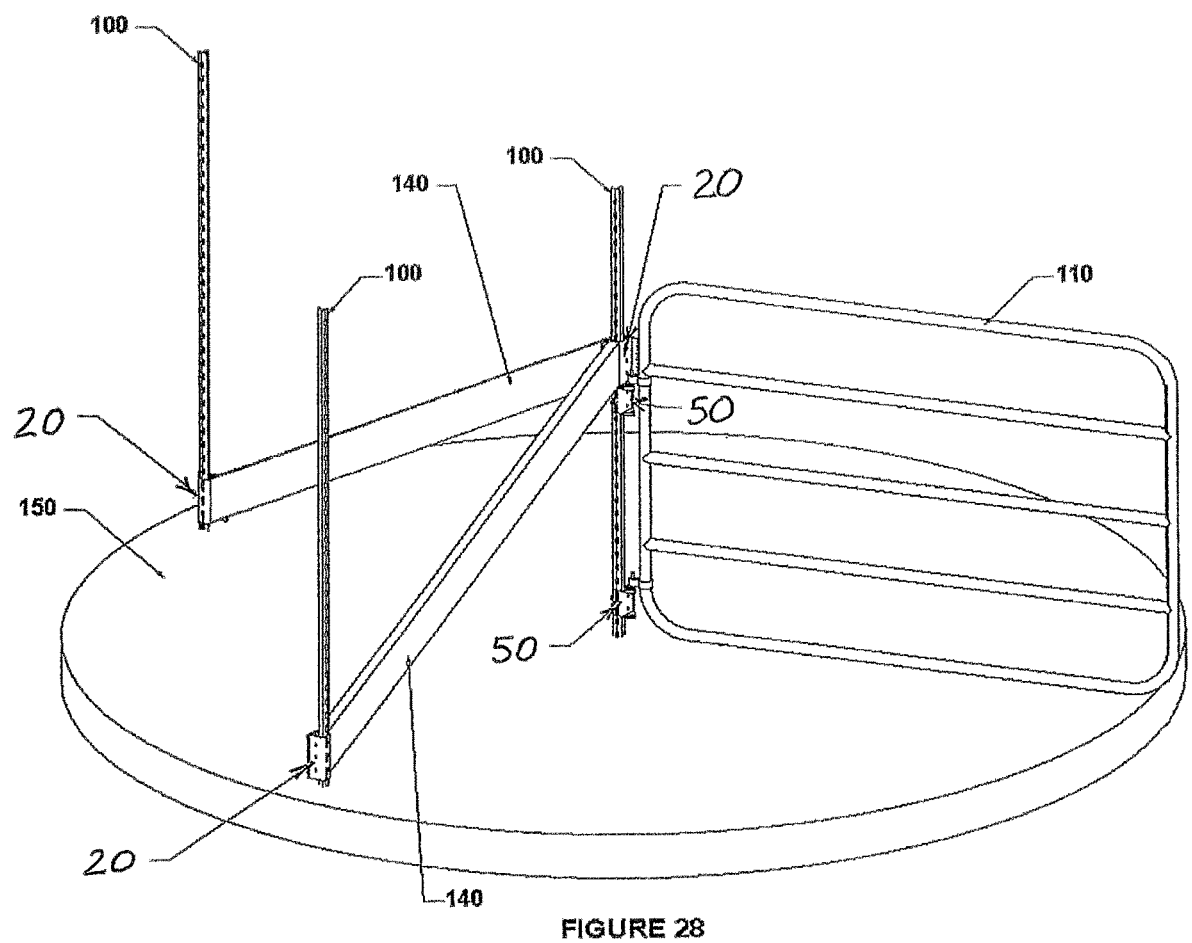
FIG. 28 is a perspective view of a fence corner where two fence lines intersect and where a gate is supported on the corner post, the perspective view illustrating the use of a Large Series Tee Post Bracket Assembly as in FIG. 2 on each of the two outer Tee Posts. The perspective view further illustrates the use of a Large Series Tee Post Bracket Assembly as in FIG. 1 at the top of the center Tee Post. The Large Series Tee Post Bracket at the top of the center post is assembled with the accessory Brace Plate as in item 21. The perspective view illustrates the use Wooden Braces. The perspective view shows the use of two Small Series Tee Post Bracket Assemblies as shown in FIGS. 18 and 19 secured to the Tee Post providing a hinge for the gate.

FIG. 28 depicts a typical field fence application where a corner post and gate 110 is required. FIG. 28 illustrates how components of the present invention are used to create a sturdy and secure field fence corner post capable of accommodating and supporting standard field fence gates 110. The bracket in this illustration serves to provide a means to brace the corner post with wooden braces 140. Also located on the corner post are two brackets 50. These brackets are configured as illustrated in FIGS. 18 and 19. The brackets serve as hinges to attach and support the gate at the top and bottom.

Figure 29:
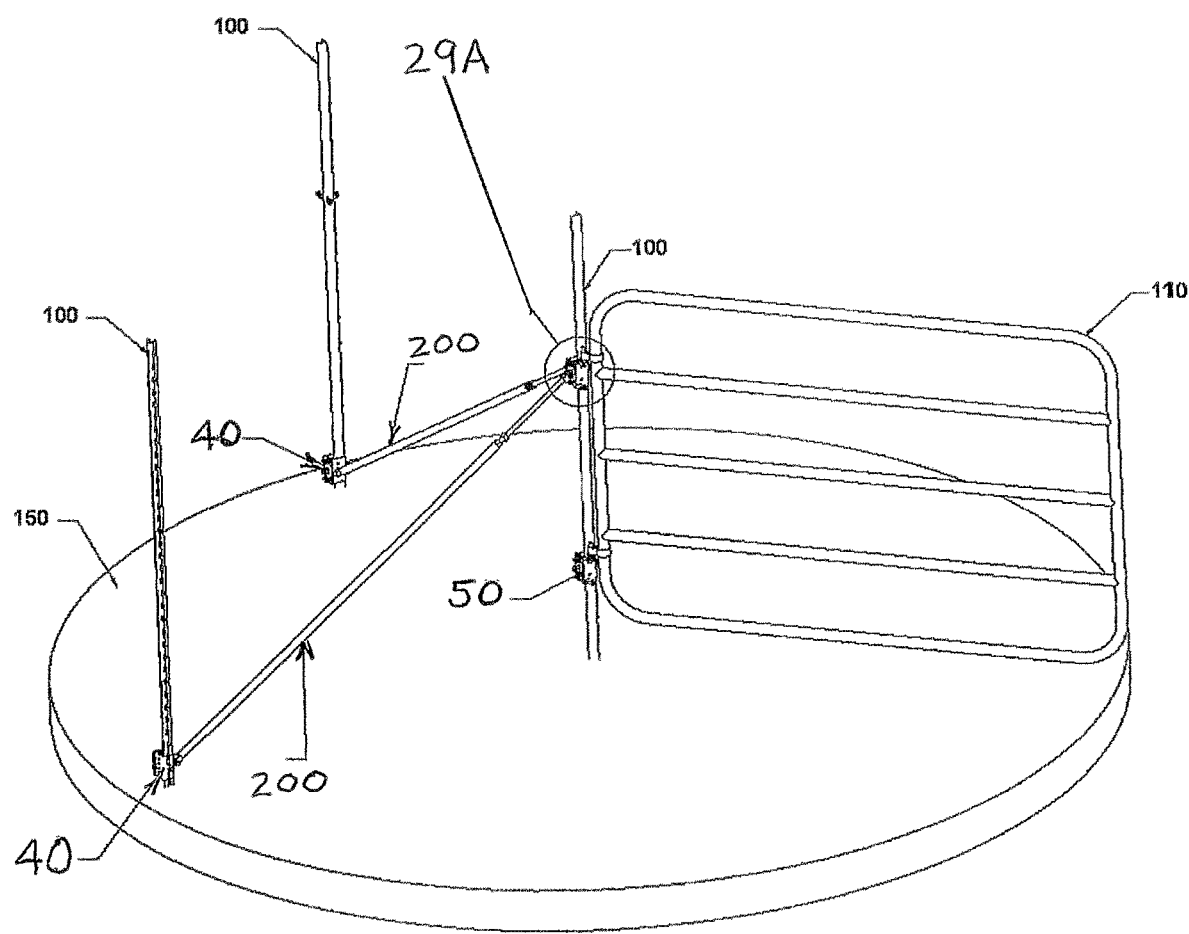
FIG. 29 is a perspective view of a fence corner where two fence lines intersect and where a gate is supported on the corner post. The perspective view illustrates the use of a Small Series Tee Post Bracket Assembly as in FIG. 4 on each of the two outer Tee Posts. The perspective view illustrates the use of two Small Series Tee Post Bracket Assemblies as in FIGS. 18 and 19 on the center Tee Post. The perspective view illustrates the use Adjustable Brace Assemblies as shown in FIGS. 20a and 20b.
Figure 29A:
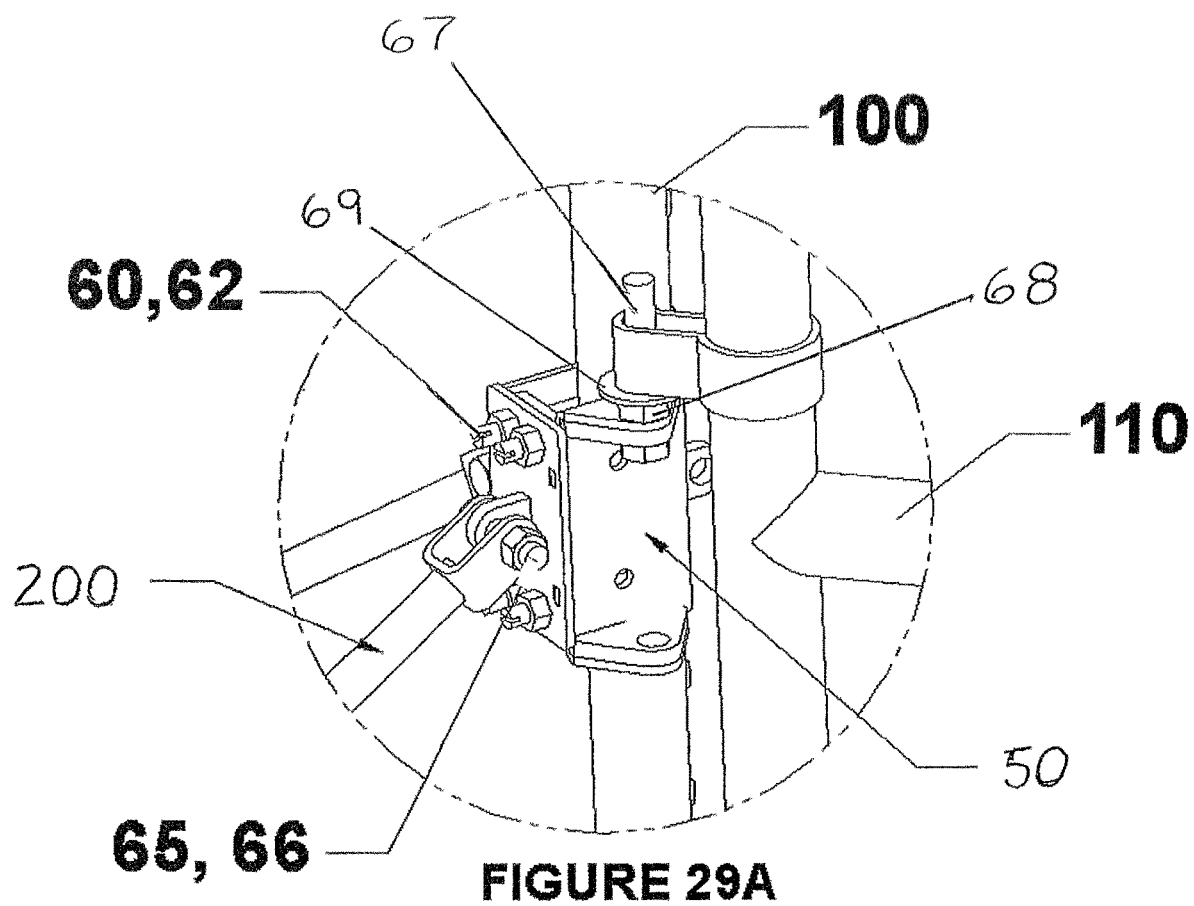
FIG. 29A is an isolated view on an enlarged scale taken from FIG. 29, showing the Small Series Tee Post Bracket Assembly as in FIGS. 18 and 19 used to support the top of the corner post and provide a hinge for the top of the gate.

FIG. 29 and FIG. 29A depict a typical field fence application where a corner post and gate is required. The bracket 50 in this illustration serves to provide a means to brace the corner post with adjustable brace assembly 200 and serve as a hinge at the top support of the gate. Also located on the corner post is another bracket 50 to serve as a hinge at the bottom support of the gate. FIG. 29A illustrates how the bracket 50 and gate 110 are attached as well as how the adjustable brace assembly 200 is attached.

It is understood that while certain forms of this invention have been illustrated and described, it is not limited thereto except insofar as such limitations are included in the following claims and allowable functional equivalents thereof.

The invention claimed is:

1. A fence support system for attachment to a plurality oft-posts each having a plurality of cleats spaced apart along a t-post shaft, said fence support system, comprising:
   a bracket having a body portion and a flange coupled to and extending away from said body portion;
   wherein:
   said body portion has a tubular configuration having an inner face, an outer face opposite said inner face, and a pair of side faces extending between said inner and outer faces, respectively, said inner, outer, and pair of side faces, collectively, defining an interior area configured to receive a respective t-post;

said outer face defines a plurality of slots, each slot configured to receive a respective cleat associated with said respective t-post;

said flange is coupled to said inner face of said body portion and includes a first flange section being co-planar with and extending away from said inner face, said first flange section defining a plurality of holes.

2. The fence support system as in claim 1, wherein said flange includes a second flange section being co-planar with and extending away from said inner face in a direction opposite said first flange section, said second flange section defining a plurality of holes.

3. The fence support system as in claim 2, wherein said first flange section and said second flange section have a unitary and planar construction that extends perpendicularly away from said pair of side faces of said body portion of said bracket.

4. The fence support system as in claim 3 wherein said pair of side faces defines a plurality of mounting apertures.

5. The fence support system as in claim 3, further comprising:
a first accessory plate removably coupled to said body portion of said bracket;
a first auxiliary bracket removably coupled to said flange of said bracket when a mounting fastener is engaged.

6. The fence support system as in claim 1, further comprising at least one mounting fastener positioned in said interior area of said body portion and extending through said inner face for mounting said bracket.

7. The fence support system as in claim 1, wherein said flange has a flange width between 1.5 to 8 inches and said inner face and said flange, together, have a width of 3.5 to 10 inches.

8. The fence support system as in claim 1, wherein said flange has a flange width between 1.5 to 8 inches and said inner face and said flange, together, have a width of 1.5 to 3.5 inches.

9. The fence support system as in claim 1, further comprising a plate mounted atop upper edges of said bracket, said plate having a circular configuration and defining a plurality of plate apertures adjacent a peripheral edge of said plate.

10. The fence support system as in claim 9, wherein said plate has a diameter of between 2.5 and 12 inches.

11. The fence support system as in claim 1, further comprising a plurality of clevises mounted to and extending away from said inner, outer, and pair of side faces of said body portion of said bracket, respectively.

12. The fence support system as in claim 1, further comprising:
a pair of mounting fasteners coupled to opposed upper and lower edges of one side face of said body portion of said bracket, each mounting fastener defining a mounting hole; and
a plurality of clevises coupled to at least three sides of said body portion of said bracket.

13. The fence support system as in claim 12, further comprising an additional fastener mounted to and extending upwardly away from an upper mounting fastener of said pair of mounting fasteners, said additional fastener having a tubular configuration.

14. The fence support system as in claim 1, further comprising:
a first accessory plate removably coupled to said body portion of said bracket;
a first accessory bracket removably coupled to said flange of said bracket when a mounting fastener is engaged.

15. The fence support system as in claim 14, further comprising:
a second accessory bracket coupled to said large bracket;
said second accessory bracket that includes three sections having a U-shaped configuration and coupled to said outer face and said pair of side faces of said body portion of said large bracket, respectively; and
a clevis fastener mounted to said three sections of said second accessory bracket, respectively.

16. The fence support system as in claim 1, further comprising a wedge coupled to an upper edge of said bracket, said wedge being operable to couple said bracket to an object vertically adjacent said large bracket.

17. The fence support system as in claim 1, further comprising an adjustable brace assembly having a housing defining an interior space and a rod member positioned in said interior space, said rod member being slidably movable between a retracted configuration substantially inside said housing and a deployed configuration extending substantially outside said housing.

18. The fence support system as in claim 17, wherein:
said housing includes a threaded surface inside said interior space; and
said rod member includes a threaded surface threadably connected to said threaded surface of said housing so that said rod member is threadably movable between said retracted and said deployed configurations.

19. A fence support system for attachment to a plurality of t-posts each having a plurality of cleats spaced apart along a t-post shaft, said fence support system, comprising:
a bracket having a body portion and a flange coupled to and extending away from said body portion;
wherein:
said body portion has a tubular configuration having an inner face, an outer face opposite said inner face, and a pair of side faces extending between said inner and outer faces, respectively, said inner, outer, and pair of side faces, collectively, defining an interior area configured to receive a respective t-post;
said outer face defines a plurality of slots, each slot configured to receive a respective cleat associated with said respective t-post;
said flange is coupled to said inner face of said body portion and includes a first flange section being co-planar with and extending away from said inner face, said first flange section defining a plurality of holes;
said flange includes a second flange section being co-planar with and extending away from said inner face in a direction opposite a direction of said first flange section, said second flange section defining a plurality of holes;
a plate mounted atop upper edges of said bracket, said plate having a circular configuration and defining a plurality of plate apertures adjacent a peripheral edge of said plate;
an adjustable brace assembly having a housing defining an interior space and a rod member positioned in said interior space, said rod member being slidably movable between a retracted configuration substantially inside said housing and a deployed configuration extending substantially outside said housing.

20. The fence support system as in claim 19, wherein:
said rod member includes a free end having a double clevis fastener; and
said tubular assembly includes an end opposite said rod member that includes a double clevis fastener.

* * * * *